United States Patent
Fujita

(10) Patent No.: US 12,091,561 B2
(45) Date of Patent: Sep. 17, 2024

(54) RECORDING METHOD AND RECORDING APPARATUS

(71) Applicant: Seiko Epson Corporation, Tokyo (JP)

(72) Inventor: Kunihiro Fujita, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 147 days.

(21) Appl. No.: 17/718,500

(22) Filed: Apr. 12, 2022

(65) Prior Publication Data

US 2022/0332963 A1    Oct. 20, 2022

(30) Foreign Application Priority Data

Apr. 13, 2021 (JP) .................. 2021-067567

(51) Int. Cl.
| | |
|---|---|
| C09D 11/30 | (2014.01) |
| B41J 2/01 | (2006.01) |
| B41M 5/00 | (2006.01) |
| B41M 7/00 | (2006.01) |

(52) U.S. Cl.
CPC ................ C09D 11/30 (2013.01); B41J 2/01 (2013.01); B41M 5/0011 (2013.01); B41M 5/0023 (2013.01); B41M 7/009 (2013.01)

(58) Field of Classification Search
CPC ....... C09D 11/30; C09D 11/322; C09D 11/38; B41J 2/01; B41M 5/0011; B41M 5/0023; B41M 7/009; B41M 5/0047; B41M 5/0064
USPC ......................................................... 347/100
See application file for complete search history.

(56) References Cited

U.S. PATENT DOCUMENTS

| | | | |
|---|---|---|---|
| 2010/0103237 A1* | 4/2010 | Hara ................. | B41J 11/00244 347/102 |
| 2013/0213440 A1* | 8/2013 | Ohta ................... | C09D 11/40 106/31.6 |
| 2014/0204156 A1* | 7/2014 | Gotou .................. | C09D 11/40 347/100 |
| 2015/0258783 A1* | 9/2015 | Toda .................... | C09D 11/38 428/207 |
| 2016/0368279 A1* | 12/2016 | Perez Gellida ........... | B41J 2/01 |
| 2018/0265725 A1 | 9/2018 | Kagata et al. | |
| 2022/0137553 A1* | 5/2022 | Deocon Mir ............ | B41J 29/02 399/92 |

FOREIGN PATENT DOCUMENTS

JP      2018-154014 A    10/2018

* cited by examiner

*Primary Examiner* — Jason S Uhlenhake
*Assistant Examiner* — Alexander D Shenderov
(74) *Attorney, Agent, or Firm* — Harness, Dickey & Pierce, P.L.C.

(57) ABSTRACT

A recording method of the present disclosure includes: an adhesion step of ejecting an ink composition from an ink jet head so as to be adhered to a recording medium; and a primary heating step of heating the ink composition adhered to the recording medium in the adhesion step, and the ink composition is a water-based ink containing an organic compound which is a solid at 25° C. having a standard boiling point of 280° C. or less and which has a solubility of 50 [g/100 g of water] or more in water at 25° C.

14 Claims, 7 Drawing Sheets

RECORDING METHOD AND RECORDING APPARATUS

The present application is based on, and claims priority from JP Application Serial Number 2021-067567, filed Apr. 13, 2021, the disclosure of which is hereby incorporated by reference herein in its entirety.

BACKGROUND

1. Technical Field

The present disclosure relates to a recording method and a recording apparatus.

2. Related Art

An ink jet type recording method in which an ink composition is ejected in the form of liquid droplets from a significantly fine nozzle and is then adhered to a recording medium to form an image has been widely used. Compared to other recording methods, this recording method has advantages in that, for example, even by an apparatus having a simple structure, a high resolution image can be obtained.

The use of an ink jet type recording method has also been studied in a sign printing field, a high-speed label printing field, and the like. In addition, for example, in the case in which an image is recorded on an ink low-absorbing recording medium, such as art paper or coated paper, or on an ink non-absorbing recording medium such as a plastic film, as the ink composition, in view of global environmental protection and the like, the use of a water-based ink composition has been studied, and in view of improvement in abrasion resistance of a recorded matter, a wax to be contained in a water-based ink composition has been already known.

Accordingly, for example, when recording is performed on a recording medium using a water-based ink composition, in order to improve the abrasion resistance of an image, a proposal has been made in that a water-based ink composition containing two types of waxes is used together with a reaction liquid containing an aggregating agent to aggregate constituent components of the ink composition (for example, see JP-A-2018-154014).

However, by the method as described above, various problems have occurred such that an ejection stability of the ink composition by an ink jet method is liable to be degraded, and so-called aggregation irregularity is liable to occur so as to degrade an image quality by gathering of liquid droplets of the ink composition ejected on a recording medium, and in addition, the ejection stability is further degraded, and the abrasion resistance is also degraded.

SUMMARY

The present disclosure is made to solve the problems described above and can be realized as the following application examples.

A recording method according to an application example of the present disclosure comprises: an adhesion step of ejecting an ink composition from an ink jet head to be adhered to a recording medium, the adhesion step being performed on a scanning region of the recording medium by at least one main scanning; and a primary heating step of heating the ink composition adhered to the recording medium in the adhesion step, and in addition, the ink composition is a water-based ink containing an organic compound which is a solid at 25° C. having a standard boiling point of 280° C. or less and which has a solubility of 50 [g/100 g of water] or more in water at 25° C.

In addition, in a recording method according to another application example of the present disclosure, the organic compound may have a standard boiling point of 160° C. to 280° C.

In addition, in a recording method according to another application example of the present disclosure, a content of the organic compound in the ink composition may be 2.0 to 20.0 percent by mass.

In addition, in a recording method according to another application example of the present disclosure, the organic compound may have a melting point of more than 25° C. to 150° C.

In addition, in a recording method according to another application example of the present disclosure, the organic compound may be at least one selected from the group consisting of a diol having an aliphatic skeleton with a branched structure, a diol having a cyclic structure, and a cyclic amide.

In addition, in a recording method according to another application example of the present disclosure, the organic compound may be at least one selected from the group consisting of neopentyl glycol, 1,2-cyclohexanediol, pinacol, ε-caprolactam, 2-ethyl-2-methyl-1,3-propanediol, 2-methyl-2-propyl-1,3-propanediol, and 2,5-dimethyl-2,5-hexanediol.

In addition, in a recording method according to another application example of the present disclosure, the ink composition may further contain as an organic solvent, a polyol which is a liquid at 25° C. having a standard boiling point of 160° C. or more.

In addition, in a recording method according to another application example of the present disclosure, the ink composition may further contain a silicone-based surfactant having an HLB value of 10 or less.

In addition, in a recording method according to another application example of the present disclosure, when the ink composition is heated in the primary heating step, the recording medium may have a surface temperature of 28° C. to 50° C.

In addition, in a recording method according to another application example of the present disclosure, the number of the main scannings performed on the same scanning region of the recording medium may be 1 to 10.

In addition, in a recording method according to another application example of the present disclosure, the ink jet head may have a circulation mechanism to circulate the ink composition.

In addition, a recording method according to another application example of the present disclosure may further comprise, after the primary heating step, a secondary heating step of further heating the recording medium.

In addition, in a recording method according to another application example of the present disclosure, the recording medium may be a low-absorbing recording medium or a non-absorbing recording medium.

A recording apparatus according to a still another application example of the present disclosure is to perform recording by the recording method according to the above-described application example of the present disclosure, the recording apparatus comprising: a primary heating device to heat a recording medium in the primary heating step; and an ink jet head to eject a water-based ink to the recording medium heated by the primary heating device, the water-based ink containing an organic compound which is a solid at 25° C. having a standard boiling point of 280° C. or less and which has a solubility of 50 [g/100 g of water] or more in water at 25° C.

DESCRIPTION OF EXEMPLARY EMBODIMENTS

Figure 1:
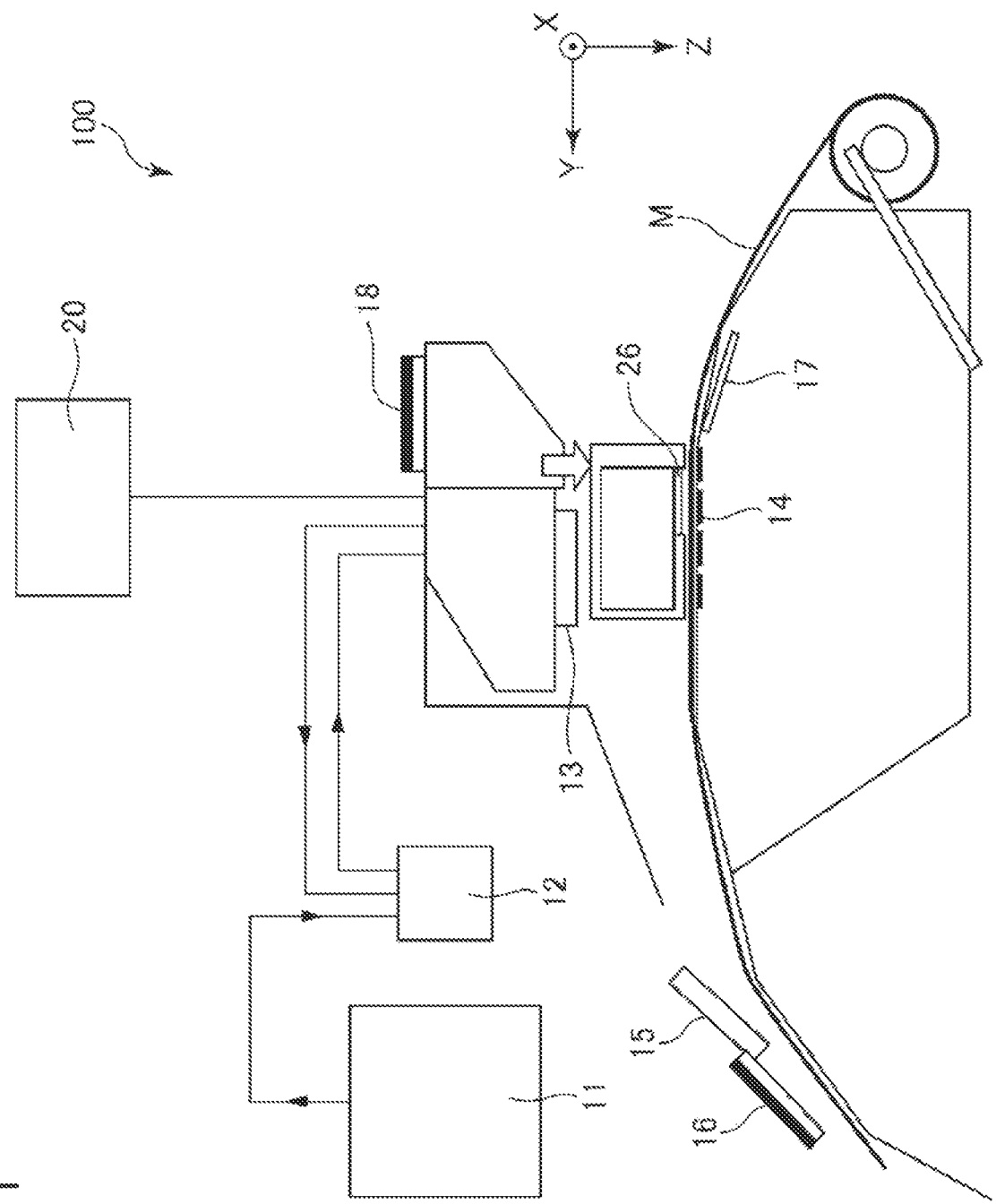
FIG. 1 is a structural view of a recording apparatus according to a preferable embodiment of the present disclosure.

Hereinafter, preferable embodiments of the present disclosure will be described in detail.

1. Recording Method

First, a recording method of the present disclosure will be described.

The recording method of the present disclosure includes an adhesion step of ejecting an ink composition from an ink jet head so as to be adhered to a recording medium, the adhesion step being performed on a scanning region of the recording medium by at least one main scanning; and a primary heating step of heating the ink composition adhered to the recording medium in the adhesion step. In addition, the ink composition is a water-based ink containing an organic compound which is a solid at 25° C. having a standard boiling point of 280° C. or less and which has a solubility of 50 [g/100 g of water] or more in water at 25° C.

Accordingly, a recording method can be provided which can stably eject the ink composition by an ink jet method, which is not likely to generate aggregation irregularity which degrades an image quality by gathering of liquid droplets of the ink composition ejected on the recording medium, and which can manufacture a recorded matter having an image excellent in abrasion resistance. In addition, generation of irregularity caused by a coffee stain phenomenon can also be effectively prevented. Hence, the image quality of an image to be formed can be made excellent. In addition, in the manufacturing of the recorded matter, that is, in the recording method, although the use of a reaction liquid in combination with the ink composition may also be considered, according to the present disclosure, the ink composition is not likely to generate the aggregation irregularity, and hence, the problem of the generation of the aggregation irregularity can be effectively prevented. In addition, the recording method described above has advantages in terms of high-speed image formation and improvement in productivity of the recorded matter.

The reasons the excellent effects as described above can be obtained are believed as described below. That is, since the specific organic compound as described above is used, the solubility of the organic compound can be made excellent in the ink composition, unwilling precipitation and the like of the organic compound can be effectively prevented in the ink composition, and a liquid droplet ejection by an ink jet method can be stably performed. In addition, since the organic compound as described above is contained, when a predetermined amount of moisture is removed in the primary heating step performed following the ejection of the ink composition by an ink jet method, the viscosity of the ink composition is rapidly increased. As a result, dots of the ink composition can be rapidly fixed at an early stage, and the dots of the ink composition can be effectively prevented from unwillingly moving on the recording medium. That is, a pinning effect can be effectively obtained. Accordingly, it is believed that the generation of the aggregation irregularity and the generation of the irregularity caused by a coffee stain phenomenon can be effectively prevented, and hence, the image quality of an image to be formed can be made excellent. In addition, since having a relatively low standard boiling point, the organic compound itself can be relatively easily vaporized by heating and is effectively prevented from unwillingly remaining in the recorded matter. In addition, since having a relatively low standard boiling point, the organic compound described above can be rapidly and easily vaporized with water by heating and is effectively prevented from unwillingly remaining in the recorded matter; however, even if the organic compound remains in the recorded matter, since the organic compound is a solid at room temperature, the image thus recorded can be effectively prevented from being disturbed by friction and the like. Hence, the abrasion resistance of the recorded matter can be made excellent, and in addition, since the image is not likely to be disturbed by a short-time heat treatment and the like, it is believed that advantages, such as high-speed image formation and improvement in productivity of the recorded matter, can also be obtained.

On the other hand, when the conditions as described above are not satisfied, satisfactory results cannot be obtained.

For example, when an organic compound having a standard boiling point of more than 280° C. is used instead of using an organic compound which satisfies the conditions as described above, the organic compound described above is difficult to sufficiently vaporize from an ink composition applied to the recording medium, and as a result, the abrasion resistance of a recorded matter is made inferior. In addition, in order to sufficiently remove the organic compound described above, the productivity of the recorded matter is seriously degraded.

In addition, when an organic compound which is liquid at 25° C. is used instead of using an organic compound which satisfies the conditions as described above, after an ink composition is applied to the recording medium, the viscosity thereof is difficult to increase in a short time, and the generation of the aggregation irregularity and the irregularity caused by a coffee stain phenomenon are made apparent, so that the image quality of an image to be formed is difficult to sufficiently improve.

In addition, when an organic compound which has a solubility of less than 50 [g/100 g of water] in water at 25° C. is used instead of using an organic compound which satisfies the conditions as described above, the solubility and dissolution stability of the organic compound described above are difficult to sufficiently improve, and the ejection stability by an ink jet method and a storage stability of an ink composition are seriously degraded.

In the following description, the organic compound which is a solid at 25° C. having a standard boiling point of 280°

C. or less and a solubility of 50 [g/100 g of water] or more in water at 25° C. is also called the "specific organic compound" in some cases.

1-1. Adhesion Step

In the adhesion step, the ink composition is ejected from the ink jet head and is adhered to the recording medium.

The ink composition will be described later in detail. In addition, in this step, a plurality of ink compositions may also be used.

As an ink jet method to eject an ink composition from an ink jet head, for example, although a piezoelectric method or a method in which an ink is ejected by bubbles generated by heating a composition to be ejected may be used, in order not to easily deteriorate constituent elements of the ink composition, a piezoelectric method is preferable.

As the recording medium, any material may be used, and for example, there may be used regular paper, paper such as ink jet exclusive paper, a plastic material, a metal, a ceramic, a wood, a shell, natural/synthetic fibers of a polyester, a wool, or the like, or a non-woven cloth.

In particular, in the present disclosure, as the recording medium, a low-absorbing recording medium or a non-absorbing recording medium may be preferably used.

Heretofore, when a low-absorbing recording medium or a non-absorbing recording medium is used as the recording medium, although the problem of the image quality degradation caused, for example, by the aggregation irregularity as described above more seriously occurred, according to the present disclosure, even when a low-absorbing recording medium or a non-absorbing recording medium is used as the recording medium, the problem as described above can be sufficiently prevented. In other words, when a low-absorbing recording medium or a non-absorbing recording medium is used as the recording medium, the effects of the present disclosure can be more significantly obtained.

In addition, the "low-absorbing recording medium or non-absorbing recording medium" in this specification indicates a "recording medium having a water absorbing amount of 10 mL/m$^2$ or less from a contact start to a point of 30 msec$^{1/2}$ by Bristow method". This Bristow method is a most popular measurement method of a liquid absorption amount in a short time and has also been employed by Japan Technical Association of the Pulp and Paper Industry (JAPAN TAPPI). The details of the test method have been disclosed in Standard No. 51 "Paper and Paperboard-Liquid Absorption Test Method-Bristow Method", JAPAN TAPPI PAPER AND PULP TEST METHODS, 2000.

As the non-absorbing recording medium, for example, there may be mentioned a plastic film which is not surface-treated for ink jet printing, that is, a plastic film on which no ink absorbing layer is formed, a medium in which a plastic is coated on a substrate such as paper, or a medium in which a plastic film is adhered to a substrate such as paper. As the plastic described above, for example, although a poly(vinyl chloride), a poly(ethylene terephthalate), a polycarbonate, a polystyrene, a polyurethane, a polyethylene, or a polypropylene may be mentioned, the plastic is not limited thereto. In addition, as the low-absorbing recording medium, for example, there may be mentioned printing paper, such as art paper, coated paper, or matte paper. In addition, so-called coating paper is also included in the low-absorbing recording medium.

In addition, the shape of the recording medium is not particularly limited, and any shape, such as a sheet" may be used.

The number of the main scannings performed on the same scanning region of the recording medium in this step is at least one, preferably 20 or less, more preferably 2 to 16, even more preferably 3 to 14, further preferably 4 to 10, even further preferably 4 to 7, and particularly preferably 4 to 5.

Accordingly, for example, the generation of the aggregation irregularity can be more effectively prevented, and the image quality of a recorded portion can be made more excellent, and in addition, the abrasion resistance of the recorded matter can be made more excellent. In addition, the productivity of the recorded matter can be made more excellent.

The number of the main scannings performed on the same scanning region is also called a pass number. The details of the number of the main scannings performed on the same scanning region will be described later in detail.

When the number of the main scannings performed on the same scanning region is small, although a recording rate can be preferably increased, on the other hand, an adhesion amount of the ink to be adhered on the same main scanning region by one main scanning tends to be increased. Hence, although the aggregation irregularity is liable to occur, according to the present disclosure, the aggregation irregularity can be preferably suppressed.

In addition, in this step, the ink jet head to eject the ink composition may include a circulation mechanism to circulate the ink composition.

In an ink jet method using an ink jet head, when the ink composition is dried in the ink jet head, foreign materials may be generated by solidification thereof, and ejection defects of the ink composition may be generated; however, when the circulation mechanism is provided, the foreign materials are not likely to be generated, and in addition, even if being generated, the foreign materials are re-dissolved, so that the ejection defects can be more effectively prevented.

In addition, a recording apparatus including an ink jet head will be described later in detail.

1-2. Primary Heating Step

In the primary heating step, the ink composition adhered to the recording medium in the adhesion step described above is heated.

Accordingly, for example, a liquid component, such as water, contained in the ink composition adhered to the recording medium can be at least partially removed, and the flow of the ink composition can be preferably suppressed.

In the primary heating step, the ink is adhered to a heated recording medium, or the ink is heated at an early stage after the ink adhesion.

After the liquid droplets of the ink composition are adhered to the recording medium, at the latest, the primary heating step is preferably started to heat the liquid droplets within 0.5 seconds.

The heating in the primary heating step may be performed, for example, by at least one of various heating mechanisms, such as a conduction type, a radiation type, and a ventilation type.

Although a surface temperature of the recording medium when the ink composition is heated in the primary heating step is not particularly limited, the surface temperature described above is preferably 28° C. to 50° C., more preferably 30° C. to 48° C., even more preferably 32° C. to 46° C., further preferably 33° C. to 40° C., and even further preferably 34° C. to 38° C.

When the ink adhesion is performed on a heated recording medium, the temperature described above is also a surface temperature of the recording medium when the ink is adhered.

Accordingly, while the ink jet head to eject the ink composition can be reliably prevented from being dried, the viscosity of the ink composition applied to the recording medium can be more efficiently increased, and hence, for example, the generation of the aggregation irregularity can be more effectively prevented. In addition, heating conditions of a secondary heating step which will be described later can be relaxed, and as a whole, it is preferable in terms of energy saving and productivity of the recorded matter.

In addition, when the temperature varies in the primary heating step, as the surface temperature of the recording medium described above, the maximum temperature of the surface temperature of the recording medium in the primary heating step is to be used.

A heating time of the recording medium in the primary heating step is preferably 0.5 to 200 seconds and more preferably 1 to 100 seconds.

1-3. Secondary Heating Step

The recording method of the present disclosure may further include, after the primary heating step, a secondary heating step of further heating the recording medium. The secondary heating step is also called a post-heating step in some cases.

Accordingly, volatile components, in particular, the specific organic compound, contained in the ink composition applied to the recording medium can be effectively prevented from unwillingly remaining, and the abrasion resistance and the reliability of a recorded matter to be finally obtained can be made more excellent. In addition, when the ink composition contains a resin which will be described later, a recorded portion can be effectively planarized, and the abrasion resistance of the recorded matter can be made more excellent, and in addition, for example, glossiness of the image can be made more excellent.

The secondary heating step is performed after the primary heating step is finished. In the secondary heating step, the heating is preferably started on a certain portion of the recording medium more than 0.5 seconds after the adhesion of the ink composition to the certain portion is completely performed.

Although a surface temperature of the recording medium when the ink composition is heated in the secondary heating step is not particularly limited, the surface temperature described above is preferably a temperature higher than the surface temperature of the recording medium in the primary heating step, and in particular, the surface temperature described above is preferably 40° C. or more, more preferably 50° C. to 120° C., even more preferably 65° C. to 100° C., and further preferably 70° C. to 90° C.

Accordingly, the effects obtained by performing the secondary heating step as described above can be more significantly obtained, and in addition, the productivity of the recorded matter can be made more excellent. In addition, it is also preferable, for example, in view of the energy saving, the prevention of unwilling degradation of constituent materials of the recorded matter, and the like.

In addition, when the temperature varies in the secondary heating step, as the surface temperature of the recording medium described above, the maximum temperature of the surface temperature of the recording medium in the secondary heating step is to be used.

A heating time of the recording medium in the secondary heating step is preferably 1 to 300 seconds and more preferably 3 to 200 seconds.

The heating in the secondary heating step may be performed by at least one of various heating mechanisms, such as a conduction type, a radiation type, and a ventilation type.

1-4. Other Steps

The recording method of the present disclosure may further include at least one step other than those described above.

For example, after the primary heating step and the secondary heating step, a cooling step of cooling the recording medium may also be included.

Accordingly, for example, stickiness of the record portion by the ink composition can be effectively suppressed. In addition, even when a printed surface of a recorded matter thus manufactured is brought into contact with another member or another recorded matter, for example, the recorded portion can be effectively prevented from being unwillingly disturbed.

When the cooling step is performed, a surface temperature of the recording medium when the above cooling step is finished is preferably 30° C. or less and more preferably –20° C. to 25° C.

1-5. Ink Composition

Next, the ink composition used in the recording method of the present disclosure will be described in detail. In the following description, the ink composition may be simply called the "ink" in some cases.

The ink composition used in the present disclosure is a water-based ink containing a specific organic compound which is a solid at 25° C. having a standard boiling point of 280° C. or less and which has a solubility of 50 [g/100 g of water] or more in water at 25° C.

In addition, in this specification, the "water-based" ink indicates an ink containing water at a content of 40 percent by mass or more with respect to the total mass of the ink composition. In addition, the content of the water is preferably 50 percent by mass or more, more preferably 60 percent by mass or more, and further preferably 70 to 98 percent by mass.

In addition, a rate of the water in all the liquid components contained in the ink composition, in more particular, a rate of the water in all the components each of which is in a liquid state in an environment at one atmospheric pressure and 25° C., is preferably 50 percent by mass or more and more preferably 60 percent by mass or more.

1-5-1. Specific Organic Compound

The ink composition contains a specific organic compound which is a solid at 25° C. having a standard boiling point of 280° C. or less and which has a solubility of 50 [g/100 g of water] or more in water at 25° C.

The ink composition is a water-based ink and in general, contains water at a sufficiently high content with respect to the content of the specific organic compound. Hence, the specific organic compound having a significantly high solubility with respect to water as described above is contained in the ink composition in a dissolved state.

Although the standard boiling point of the specific organic compound, that is, the boiling point thereof at one atmospheric pressure, may be 280° C. or less, the standard boiling point described above is preferably 160° C. to 280° C., more preferably 180° C. to 275° C., even more preferably 200° C. to 270° C., and further preferably 220° C. to 270° C.

Accordingly, the effects described above can be more significantly obtained.

In addition, when the ink composition contains at least two types of specific organic compounds, at least one specific organic compound contained in the ink composition preferably satisfies the standard boiling point condition described above, a specific organic compound having the highest content more preferably satisfies the above standard boiling point condition, and all the specific organic compounds contained in the ink composition further preferably satisfy the above standard boiling point condition.

Accordingly, the effects described above can be more significantly obtained.

Although the solubility of the specific organic compound in water at 25° C. may be 50 [g/100 g of water] or more, the solubility described above is preferably 60 [g/100 g of water] or more, more preferably 70 [g/100 g of water] or more, even more preferably 80 [g/100 g of water] or more, and further preferably 100 [g/100 g of water] or more.

Accordingly, the effects described above can be more significantly obtained.

The solubility is measured as described below. A predetermined amount of a compound is mixed with 100 g of water in an environment at 25° C. and is then stirred for 30 minutes. When an undissolved compound is not observed after the stirring, the compound is judged to be dissolved. As described above, when a predetermined amount of the compound is mixed with 100 g of water, the maximum predetermined amount which is judged to be dissolved is used as the solubility.

In addition, when the specific organic compound is dissolved in water at an arbitrary ratio, the solubility of the specific organic compound is infinite.

The melting point of the specific organic compound is preferably more than 25° C. to 150° C., more preferably 45° C. to 140° C., even more preferably 60° C. to 130° C., further preferably 65° C. to 110° C., and even further preferably 70° C. to 100° C.

Accordingly, the effects described above can be more significantly obtained.

The specific organic compound preferably has a vapor pressure of 10 Pa or more at 25° C.

Accordingly, the effects described above can be more significantly obtained.

The specific organic compound preferably has a molecular weight of 500 or less, more preferably 300 or less, and further preferably 50 to 200.

Accordingly, the effects described above can be more significantly obtained.

The specific organic compound is preferably a nonionic compound.

Accordingly, the effects described above can be more significantly obtained.

Although any organic compound which is a solid at 25° C. and which satisfies the standard boiling point condition and the solubility condition in water at 25° C. as described above may be used as the specific organic compound, a compound which satisfies the following conditions is preferable. That is, the specific organic compound is preferably a diol or a cyclic amide. In addition, the specific organic compound is preferably a compound having an aliphatic skeleton or a compound having a cyclic structure. As the compound having an aliphatic skeleton, a compound having a non-cyclic aliphatic skeleton is preferable. In the case of the compound having a cyclic structure, as the cyclic structure, for example, an alicyclic structure or a cyclic amide structure is preferable.

Furthermore, the specific organic compound is preferably at least one selected from the group consisting of a compound having an aliphatic skeleton with a branched structure and a compound having a cyclic structure.

In particular, at least one selected from the group consisting of a diol having an aliphatic skeleton with a branched structure, a diol having a cyclic structure, and a cyclic amide is more preferable.

Accordingly, the effects described above can be more significantly obtained.

As the specific organic compound which satisfies the condition of the chemical structure as described above, for example, although neopentyl glycol, 1,2-cyclohexanediol, pinacol, ε-caprolactam, 2-ethyl-2-methyl-1,3-propanediol, 2-methyl-2-propyl-1,3-propanediol, or 2,5-dimethyl-2,5-hexanediol may be mentioned, in particular, at least one selected from the group consisting of neopentyl glycol, 1,2-cyclohexanediol, pinacol, ε-caprolactam, 2-ethyl-2-methyl-1,3-propanediol, 2-methyl-2-propyl-1,3-propanediol, and 2,5-dimethyl-2,5-hexanediol is preferable, and at least one of neopentyl glycol and ε-caprolactam is more preferable.

Accordingly, the effects described above can be more significantly obtained.

A content of the specific organic compound in the ink composition is preferably 1 to 25 percent by mass, more preferably 2.0 to 20.0 percent by mass, even more preferably 3.0 to 18.0 percent by mass, and further preferably 5.0 to 15.0 percent by mass.

Accordingly, the effects described above can be more significantly obtained.

1-5-2. Water

The ink composition is a water-based ink and contains water as a constituent component.

In the ink composition, the water has a function as a solvent to dissolve the specific organic compound described above and is also an important component to improve the ejection stability of the ink composition by an ink jet method, a drying property of the ink composition on the recording medium, and the like. In addition, since the water is used as a solvent to dissolve the specific organic compound, it is also advantageous in terms of environment protection, safety of manufacturers of the ink composition and the recorded matter, and the like.

A content of the water in the ink composition is preferably 45 percent by mass or more, more preferably 50.0 to 95.0 percent by mass, even more preferably 65.0 to 93.0 percent by mass, and further preferably 80.0 to 90.0 percent by mass.

1-5-3. Colorant

The ink composition contains, in general, a colorant.

As the colorant, for example, various dyes and/or various pigments may be used. In addition, as the colorant, for example, although not being visually recognized in a normal environment, for example, a fluorescent material which enables a recorded portion formed using an ink composition to be recognized under ultraviolet radiation conditions or the like may also be used.

In particular, since being not likely to be discolored by light, gas, and the like, the pigment may be preferably used. An image formed on a recording medium using the pigment is not only excellent in image quality but also excellent in water resistance, gas resistance, light resistance, and the like, and in addition, the storage stability is also improved. The characteristics described above are significant when the image is formed on an ink non-absorbing medium or an ink low-absorbing recording medium.

As the pigment, for example, an inorganic pigment and/or an organic pigment may be mentioned.

As the inorganic pigment, for example, besides a titanium oxide and an iron oxide, a carbon black manufactured by a known method, such as a contact method, a furnace method, or a thermal method, may be used.

In addition, as the organic pigment, for example, an azo pigment, a polycyclic pigment, a nitro pigment, a nitroso pigment, or an aniline black may be used.

As the azo pigment, for example, an azo lake, an insoluble azo pigment, a condensed azo pigment, or a chelate azo pigment may be mentioned. As the polycyclic pigment, for example, a phthalocyanine pigment, a perylene pigment, a perinone pigment, an anthraquinone pigment, or a quinophthalone pigment may be mentioned.

As a black pigment, for example, a carbon black may be mentioned.

As a white pigment, for example, a white inorganic pigment, such as C.I. Pigment White 6, 18, or 21, a titanium oxide, a zinc oxide, a zinc sulfide, an antimony oxide, a magnesium oxide, or a zirconium oxide may be mentioned. Besides the white inorganic pigment mentioned above, for example, a white organic pigment, such as hollow resin fine particles or high molecular weight material particles, may also be used.

As other chromatic color pigments, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, or 180; C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245; C.I. Pigment Violet 19, 23, 32, 33, 36, 38, 43, or 50; C.I. Pigment Blue 1, 2, 3, 15, 15:1, 15:2, 15:3, 15:34, 15:4, 16, 18, 22, 25, 60, 65, or 66; C.I. Vat Blue 4 or 60; C.I. Pigment Green 7 or 10, C.I. Pigment brown 3, 5, 25, or 26; or C.I. Pigment Orange 1, 2, 5, 7, 13, 14, 15, 16, 24, 34, 36, 38, 40, 43, or 63.

In addition, as a pearl pigment, for example, a pigment, such as a titanium oxide coated mica, a fish scale flake, or a bismuth oxychloride, having pearl glossiness or interference glossiness may be mentioned.

Although a metallic pigment is not particularly limited, for example, there may be mentioned particles of a single metal, such as aluminum, silver, gold, platinum, nickel, chromium, tin, zinc, indium, titanium, or copper, or particles of an alloy thereof.

A content of the colorant in the ink composition is preferably 0.5 to 10.0 percent by mass, more preferably 1.0 to 7.0 percent by mass, and further preferably 3.0 to 6.0 percent by mass.

Accordingly, for example, while a color density of an image to be formed on the recording medium is maintained sufficiently high, for example, the ejection stability of the ink composition by an ink jet method and the storage stability thereof can be made more excellent.

In addition, when the ink composition is a clear ink, the ink composition described above may not contain a colorant.

1-5-4. Organic Solvent

The ink composition may also contain an organic solvent in the form of a liquid at 25° C.

Since the ink composition contains an organic solvent, clogging at an ink jet head can be more effectively prevented. In addition, since the ink composition contains an organic solvent, the drying property of the ink composition ejected on the recording medium is made preferable, and an image more excellent in image quality and abrasion resistance can be obtained.

As the organic solvent used for the ink composition, a water-soluble organic solvent is preferable.

Accordingly, a moisture retaining property of the ink composition can be improved, and for example, unwilling precipitation of a solid component of the ink composition by drying at an ink jet head or the like can be more effectively prevented. In addition, the viscosity of the ink composition can be more preferably adjusted. As a result, the ejection stability of the ink composition by an ink jet method can be made more excellent.

Although the water-soluble organic solvent may be an organic solvent having a solubility in water, for example, an organic solvent having a solubility of 10 [g/100 g of water] or more in water at 25° C. may be preferably used.

A boiling point of the water-soluble organic solvent at one atmospheric pressure, that is, a standard boiling point thereof, is preferably 150° C. to 350° C. and further preferably 160° C. to 280° C.

Accordingly, the moisture retaining property of the ink composition can be further improved, and for example, unwilling precipitation of the solid component of the ink composition by drying at an ink jet head or the like can be further effectively prevented. As a result, the ejection stability of the ink composition by an ink jet method can be made more excellent. In addition, after the ink composition is ejected, when needed, since being relatively easily vaporized, the water-soluble organic solvent can be effectively prevented from unwillingly remaining in a recorded matter to be manufactured.

Although the water-soluble organic solvent is not particularly limited, for example, a polyol, a nitrogen-containing solvent, an ester, a glycol ether, or a cyclic ester may be mentioned.

The polyol is a compound having at least two hydroxy groups in its molecule. The number of hydroxy groups in the molecule is preferably 2 to 4 and more preferably 2 to 3.

As the polyol, for example, there may be mentioned a 1,2-alkanediol, such as ethylene glycol, propylene glycol, 1,2-propanediol, 1,2-butanediol, 1,2-pentanediol, 1,2-hexanediol, or 1,2-octanediol; an alkanediol, such as 1,3-propanediol, 1,3-butanediol, 1,4-butanediol, or 1,6-hexanediol; or diethylene glycol, triethylene glycol, dipropylene glycol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, or glycerin.

Among the polyols, an alkanediol having 2 to 10 carbon atoms or a condensate formed by intermolecular condensation between hydroxy groups of alkanediols each having 2 to 10 carbon atoms is preferable. In the case of the condensate, the number of condensations is preferably 2 to 4. As the alkanediol described above, an alkanediol having 3 to 6 carbon atoms is more preferable, an alkanediol having 3 to 5 carbon atoms is further preferable, and an alkanediol having 3 to 4 carbon atoms is particularly preferable.

As the nitrogen-containing solvent, for example, an amide-based solvent may be mentioned. As the amide-based solvent, for example, a cyclic amide-based solvent or a non-cyclic amide-based solvent may be mentioned. As the cyclic amide-based solvent, for example, a pyrrolidone may be mentioned. As the non-cyclic amide-based solvent, for example, an alkoxyalkylamide may be mentioned.

As the cyclic amide-based solvent, for example, a pyrrolidone, such as N-methyl-2-pyrrolidoen, N-ethyl-2-pyrrolidoen, N-vinyl-2-pyrrolidoen, 2-pyrrolidoen, 1-(2-hydroxyethyl)-2-pyrrolidoen, N-butyl-2-pyrrolidoen, or 5-methyl-2-pyrrolidoen, may be mentioned.

As the non-cyclic amide-based solvent, for example, an alkoxyalkylamide may be mentioned, and for example, there may be mentioned 3-methoxy-N,N-dimethylpropionamide, 3-methoxy-N,N-diethylpropionamide, 3-methoxy-N,N- methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide.

As the ester, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxybutyl acetate; or a glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, propylene glycol acetate propionate, propylene glycol acetate butyrate, dipropylene glycol acetate butyrate, or dipropylene glycol acetate propionate.

As the glycol ether, for example, a monoether or a diether of an alkylene glycol may be mentioned. As a concrete example of the glycol ether, for example, there may be mentioned an alkylene glycol monoalkyl ether, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, or tripropylene glycol monobutyl ether; or an alkylene glycol dialkyl ether, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methylethyl ether, diethylene glycol methylbutyl ether, triethylene glycol dimethyl ether, triethylene glycol diethyl ether, triethylene glycol dibutyl ether, triethylene glycol methylbutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or tripropylene glycol dimethyl ether.

As the cyclic ester, for example, there may be mentioned a lactone, such as β-propiolactone, γ-butyrolactone, δ-valerolactone, ε-caprolactone, β-butyrolactone, ρ-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, or ε-decanolactone, or a compound in which a hydrogen atom of a methylene group adjacent to the carbonyl group of one of the compounds mentioned above is substituted by an alkyl group having 1 to 4 carbon atoms.

A content of the organic solvent in the ink composition is preferably 1.0 to 40.0 percent by mass, more preferably 5.0 to 35.0 percent by mass, even more preferably 8.0 to 30.0 percent by mass, and further preferably 10 to 25 percent by mass.

The ink composition contains, as the organic solvent, preferably a polyol and particularly preferably a polyol having a standard boiling point of 160° C. or more. Accordingly, the moisture retaining property of the ink composition can be made more excellent, and the solid component of the ink composition can be more effectively prevented from being unwillingly precipitated by drying at the ink jet head or the like. In addition, the viscosity of the ink composition can be more preferably adjusted. As a result, the ejection stability of the ink composition by an ink jet method can be made more excellent.

In addition, when the ink composition contains an organic solvent, and in particular, contains a polyol, since the ejection stability of the ink composition by an ink jet method can be made more excellent, even if no circulation mechanism is provided in the ink jet head, the ejection stability is preferably made more excellent.

When the ink composition contains, as the organic solvent, the polyol as described above, the standard boiling point of the polyol is preferably 160° C. to 280° C., more preferably 170° C. to 250° C., and further preferably 180° C. to 230° C.

When the ink composition contains a polyol as the organic solvent, a content of the polyol in the ink composition may be set to the preferable content of the organic solvent described above or may be preferably 0.5 to 25.0 percent by mass, more preferably 1.0 to 20.0 percent by mass, even more preferably 3.0 to 15.0 percent by mass, and further preferably 5.0 to 12.0 percent by mass.

In addition, a content of the polyol having a standard boiling point in the range described above is preferably set in the range described above.

The content of the organic solvent in the ink composition is preferably 1.0 to 26.0 percent by mass, more preferably 1.5 to 21.0 percent by mass, and further preferably 3.5 to 16.0 percent by mass.

The ink composition contains preferably not more than 1 percent by mass of a polyol having a standard boiling point of more than 280° C., more preferably not more than 0.5 percent by mass, and further preferably not more than 0.2 percent by mass and may contain no polyol described above. Furthermore, the ink composition contains preferably not more than 1 percent by mass of an organic solvent having a standard boiling point of more than 280° C., more preferably not more than 0.5 percent by mass, and further preferably not more than 0.2 percent by mass and may contain no organic solvent described above. In the case described above, the abrasion resistance is preferably made more excellent.

1-5-5. Resin

The ink composition may also contain a resin.

The resin has, for example, a function to tightly fix a solidified ink composition on the recording medium. In addition, the resin is a component to further improve the abrasion resistance and the like of a recorded matter and is also a component to contribute to improvement in image quality, such as glossiness, of the recorded matter.

When the ink composition contains a resin, the resin may be either in a dissolved state or in a dispersed state in the ink composition.

Although the resin contained in the ink composition is not particularly limited, for example, there may be mentioned an acrylic resin, a vinyl acetate resin, a vinyl chloride resin, a butadiene resin, a styrene resin, a polyester resin, a cross-linked acrylic resin, a cross-linked styrene resin, a benzoguanamine resin, a phenol resin, a silicone resin, an epoxy resin, an urethane resin, a paraffin resin, a fluorine resin, a water-soluble resin, or a copolymer formed from at least two monomers forming the resins mentioned above. Although the copolymer is not particularly limited, for example, a styrene-butadiene resin or a styrene-acrylic resin may be mentioned. In addition, as the resin, a polymer latex containing at least one of the resins mentioned above may also be used. For example, there may be mentioned a polymer latex containing fine particles of an acrylic resin, a styrene-acrylic resin, a styrene resin, a cross-linked acrylic resin, a cross-linked styrene resin, or the like.

The acrylic resin is a homopolymer or a copolymer obtained by polymerization at least using an acrylic-based monomer as a monomer. As the acrylic-based monomer, for example, a (meth)acrylate, (meth)acrylic acid, acrylamide, or acrylonitrile may be mentioned. When the acryl resin is a copolymer, as the copolymer, for example, an acrylic vinyl resin using a vinyl-based monomer as another monomer may be mentioned, an in particular, for example, a styrene-acrylic resin using styrene as a vinyl-based monomer may be mentioned.

Among the resins mentioned above, for example, an acrylic resin, an urethane resin, or a polyester resin is easily available and is preferably easily obtained as a resin having desired characteristics.

A content of the resin in the ink composition is preferably 0.3 to 10.0 percent by mass, more preferably 0.5 to 7.0 percent by mass, and further preferably 0.7 to 5.0 percent by mass.

Accordingly, for example, while the ejection stability of the ink composition can be made sufficiently excellent, the effects obtained by containing the resin as mentioned above can be more significantly obtained.

1-5-6. Wax

The ink composition may also contain a wax.

Accordingly, the abrasion resistance of a recorded matter to be obtained by performing the recording method of the present disclosure can be made more excellent.

As the wax, for example, a material dissolved in the ink composition or a material dispersed in the form of particles, such as an emulsion, may be mentioned.

Since the wax as described above is used, for example, the abrasion resistance of a recorded matter to be manufactured using the ink composition can be made more excellent.

Although the wax is not particularly limited, for example, there may be mentioned an ester wax between a higher fatty acid and a higher monovalent alcohol or divalent alcohol, a paraffin wax, a microcrystalline wax, or a polyolefin wax.

As the polyolefin wax, for example, a wax manufactured from an olefin, such as ethylene, propylene, or butylene, or a derivative thereof may be mentioned. In more particular, for example, a polyethylene-based wax, a polypropylene-based wax, or a polybutylene-based wax may be mentioned.

when the ink composition contains a wax, a content of the wax in the ink composition is preferably 0.1 to 5.0 percent by mass, more preferably 0.2 to 4.0 percent by mass, and further preferably 0.3 to 3.0 percent by mass.

1-5-7. Surfactant

The ink composition may also contain a surfactant. As the surfactant, for example, an anionic surfactant or a nonionic surfactant may be mentioned. As the nonionic surfactant, for example, a silicone-based surfactant, an acetylene glycol-based surfactant, or a fluorine-based surfactant may be mentioned.

As the nonionic surfactant, a silicone-based surfactant is preferable. As the silicone-based surfactant, a surfactant having an HLB value of 12 or less is preferable, and a surfactant having an HLB value of 1 to 11 is more preferable.

The ink composition may contain a silicone-based surfactant having an HLB value of 10 or less.

Accordingly, the generation of the aggregation irregularity as described above can be more effectively prevented, and an image quality of a recorded matter can be made more excellent. Hereinafter, the silicone-based surfactant having an HLB value of 10 or less is also called the "specific surfactant" in some cases.

Although the HLB value of the specific surfactant may be 10 or less, the HLB value thereof is preferably 1 to 9, more preferably 2 to 8, and further preferably 3 to 7. As a result, the effects described above can be more significantly obtained.

As a commercially available product of the specific surfactant, for example, Silface SAG005 or Silface SAG021 (manufactured by Nisshin Chemical Industry Co., Ltd.) may be mentioned.

As the anionic surfactant, for example, although a carboxylic acid type, a sulfonic acid type, a sulfate ester type, or a phosphate ester type may be mentioned, in particular, a sulfonic acid type is preferable.

The surfactant may contain a nonionic surfactant and an anionic surfactant. In the case described above, for example, the suppression in aggregation irregularity is preferably more excellent.

A content of the surfactant in the ink composition is preferably 0.01 to 2.0 percent by mass, more preferably 0.1 to 1.5 percent by mass, even more preferably 0.3 to 1.2 percent by mass, and further preferably 0.5 to 1.0 percent by mass.

When the ink composition contains the specific surfactant, although a content of the specific surfactant in the ink composition may be set in the range described above, the content described above is also preferably 0.01 to 2.0 percent by mass, more preferably 0.01 to 1.5 percent by mass, even more preferably 0.01 to 1.2 percent by mass, further preferably 0.01 to 1.0 percent by mass, even further preferably 0.02 to 0.7 percent by mass, and particularly preferably 0.03 to 0.4 percent by mass.

1-5-8. Other Components

The ink composition may also contain at least one component other than those mentioned above. Hereinafter, the components as described above are also called "other components" in this section.

As other components, for example, there may be mentioned a dispersant, a defoaming agent, a viscosity adjuster, a pH adjuster, an antiseptic agent, a fungicide, a rust inhibitor, a flame retardant, an antioxidant, an UV absorber, an oxygen absorber, a solubilizing agent, a penetrant, a chelating agent, and/or a moisture retaining agent other than organic solvents.

A content of other components in the ink composition is preferably 6.0 percent by mass or less and more preferably 5.0 percent by mass or less.

1-5-9. Other Conditions

A surface tension of the ink composition at 25° C. is not particularly limited, and the surface tension described above is preferably 20 to 60 mN/m, more preferably 25 to 50 mN/m, and further preferably 30 to 40 mN/m.

Accordingly, for example, clogging of a nozzle of an ink jet head is not more likely to be generated, and the ejection stability of the ink composition is further improved. In addition, even when the nozzle clogging is generated, the recovery can be made more excellent by capping the nozzle.

In addition, as the surface tension, a value measured by Wilhelmy method or a ring method may be used. For the measurement of the surface tension, a surface tension meter (such as DY-300, DY-500, or DY-700, manufactured by Kyowa Interface Science Co., Ltd.) may be used.

A viscosity of the ink composition at 25° C. is preferably 2 to 10 mPas and more preferably 3 to 8 mPas.

Accordingly, the ejection stability of the ink composition by an ink jet method can be made more excellent.

In addition, the viscosity may be obtained by measurement using a vibration viscometer, a rotational viscometer, a capillary viscometer, or a falling ball viscometer. For example, by the vibration viscometer, the measurement may be performed in accordance with JIS 28809.

2. Recording Apparatus

Next, a recording apparatus of the present disclosure will be described.

The recording apparatus of the present disclosure includes a primary heating device to heat a recording medium in the primary heating step; and an ink jet head to eject a water-based ink to the recording medium heated by the primary heating device, the water-based ink containing an organic compound which is a solid at 25° C. having a standard boiling point of 280° C. or less and which has a solubility of 50 [g/100 g of water] or more in water at 25° C. In addition, the recording apparatus of the present disclosure is an apparatus to perform recording by executing the recording method of the present disclosure described above.

Accordingly, a recording apparatus can be provided which can stably eject the ink composition by an ink jet method, which is not likely to generate the so-called aggregation irregularity which causes image quality degradation due to gathering of liquid droplets of the ink composition ejected to a recording medium, and which is able to manufacture a recorded matter having an excellent abrasion resistance. In addition, the generation of irregularity by a coffee stain phenomenon can also be effectively prevented. Accordingly, the image quality of an image to be formed can be made excellent. In addition, as the manufacturing of the recorded matter, that is, as the recording method, although a method in which a reaction liquid is used together with the ink composition may also be mentioned, according to the present disclosure, the aggregation irregularity of the ink composition is not likely to be generated, and hence, even if no reaction liquid is used, the generation of the aggregation irregularity can be effectively prevented. In addition, improvement in high-speed image formation and productivity of the recorded matter can also be advantageously obtained. In the recording method of this embodiment, the reaction liquid may also be used in some cases.

Figure 2:
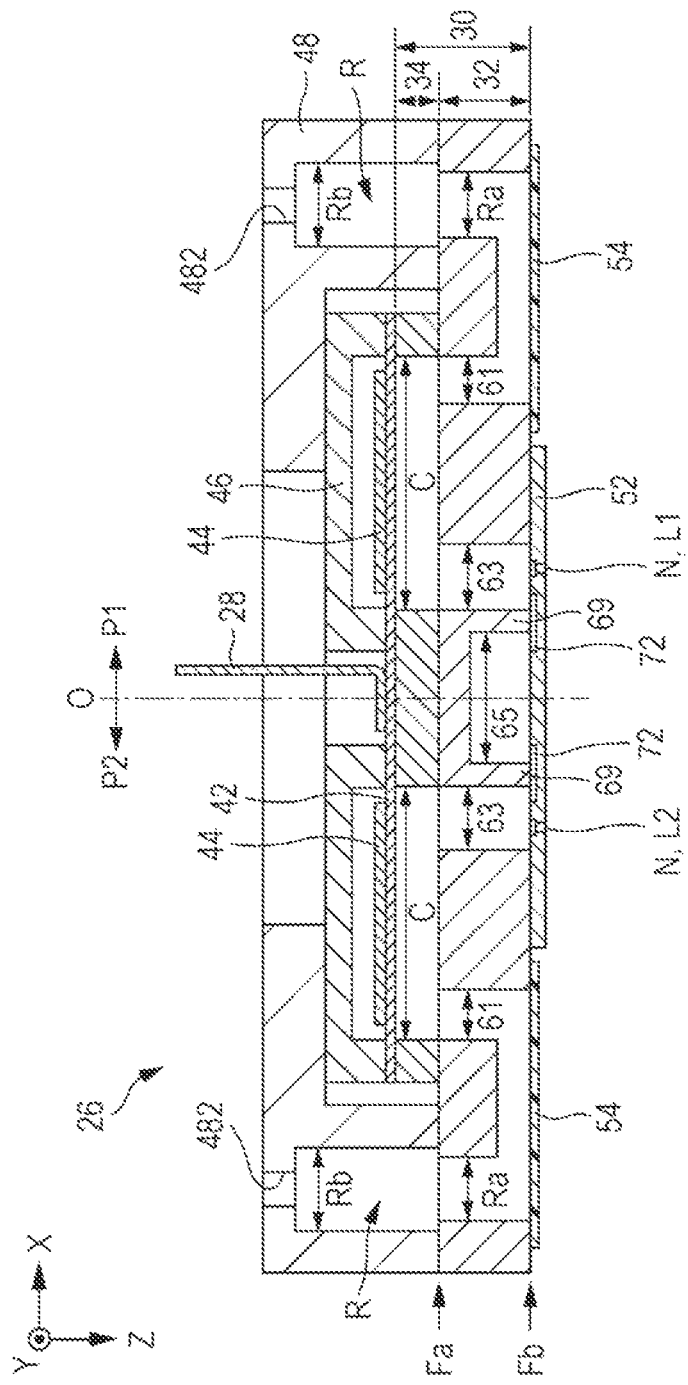
FIG. 2 is a cross-sectional view of an ink jet head.
Figure 3:
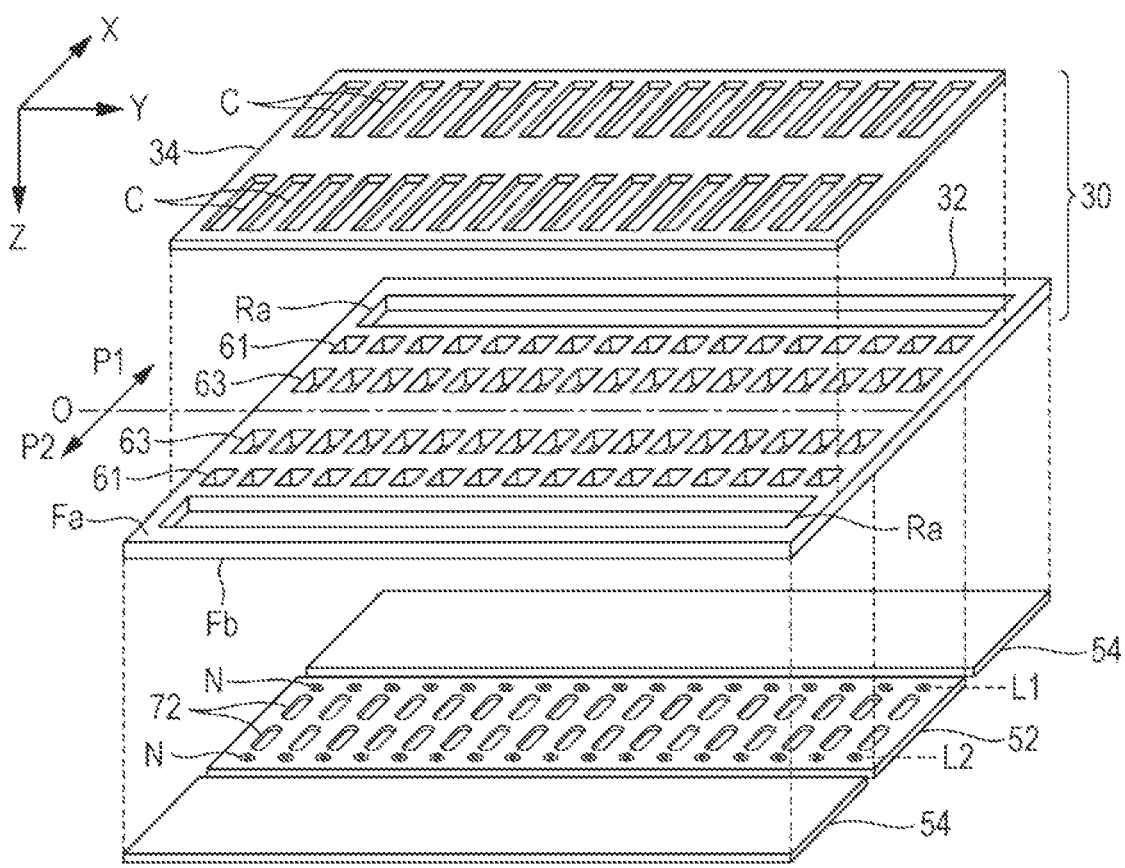
FIG. 3 is a partially exploded perspective view of the ink jet head.
Figure 4:
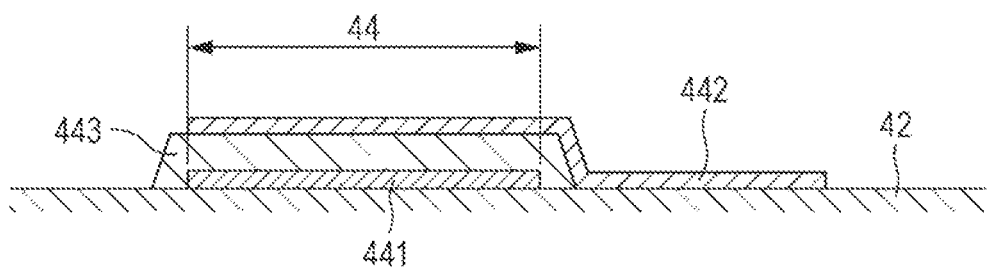
FIG. 4 is a cross-sectional view of a piezoelectric element.
Figure 5:
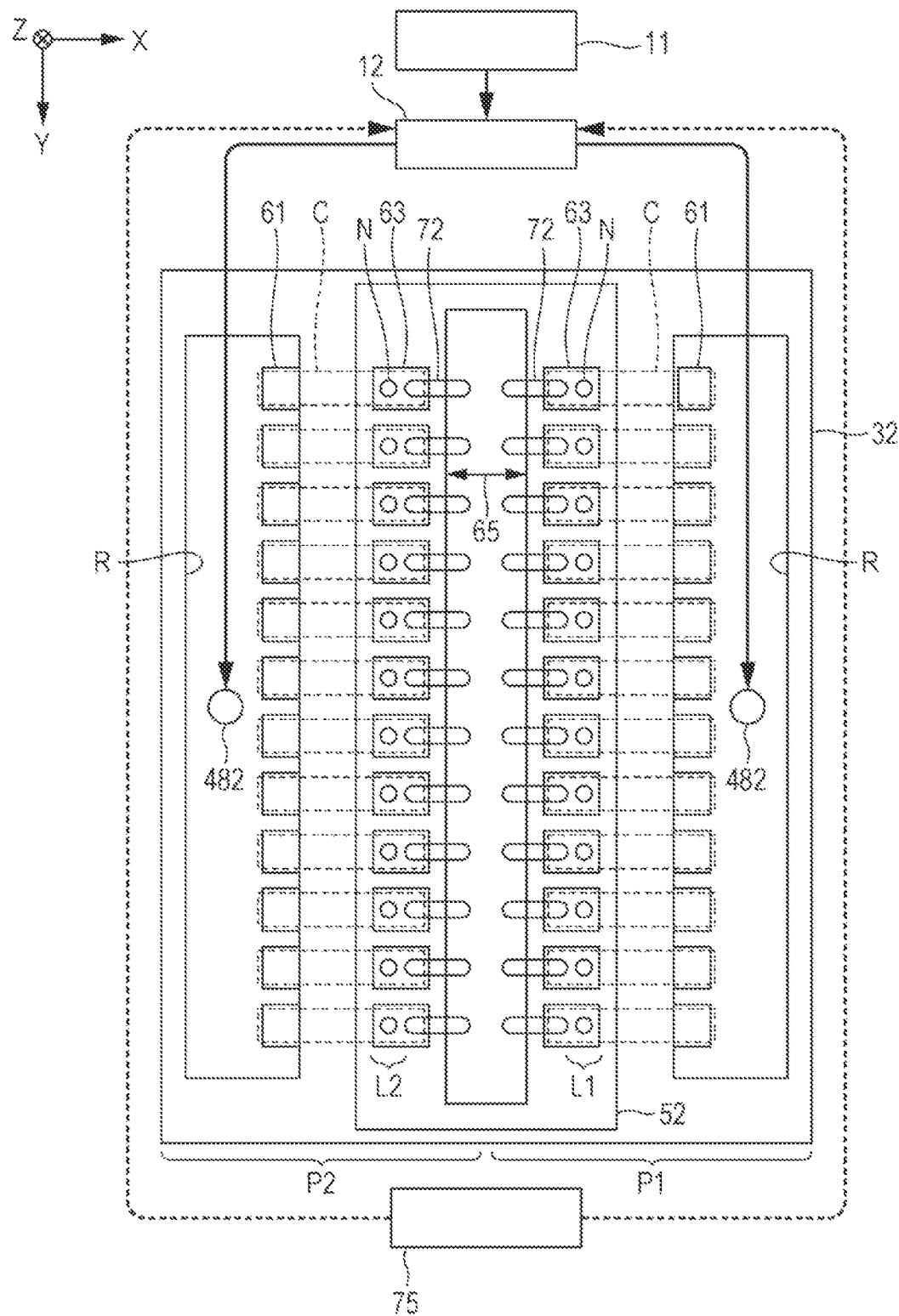
FIG. 5 is a view illustrating circulation of an ink composition in the ink jet head.
Figure 6:
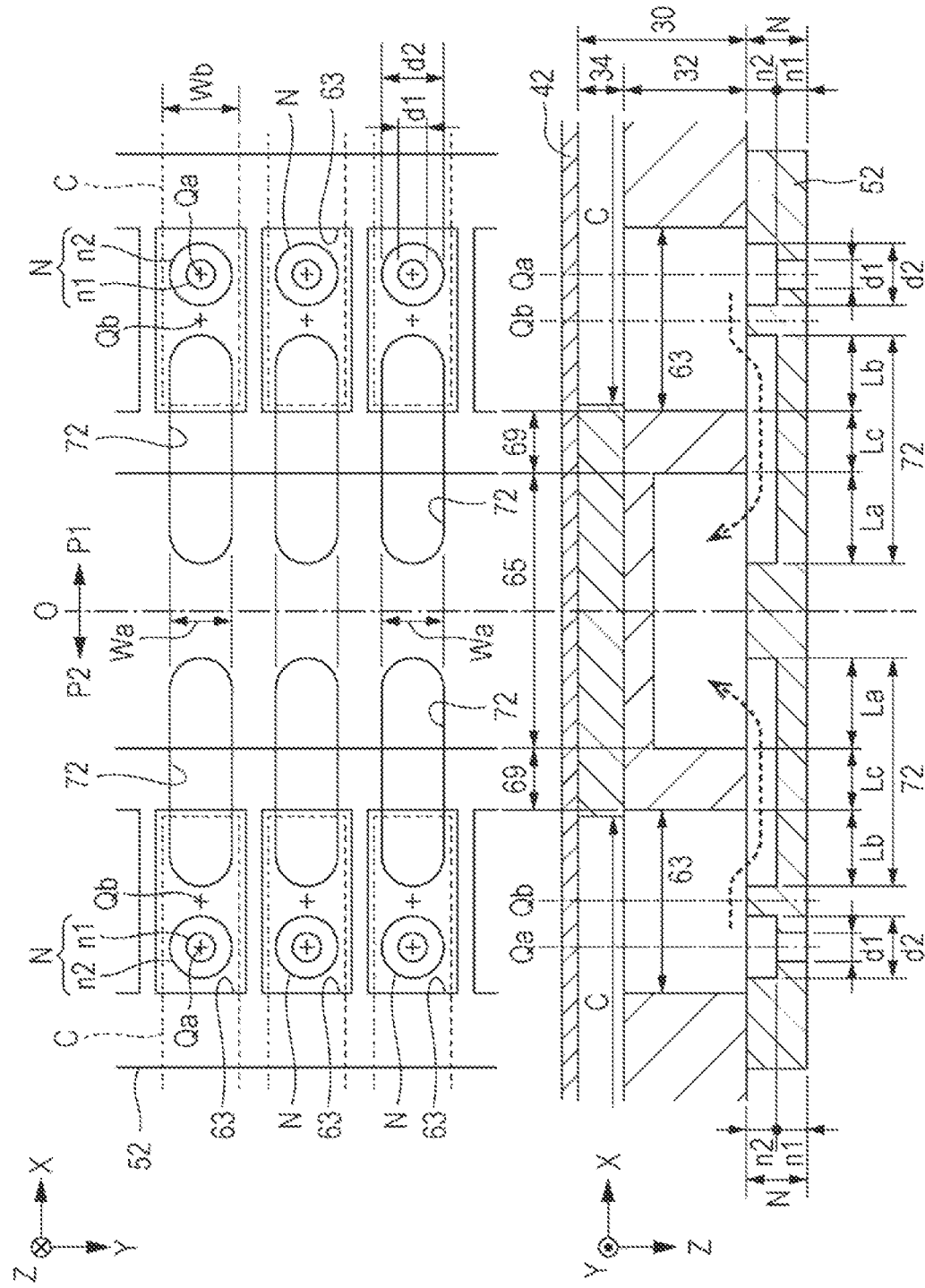
FIG. 6 includes a plan view and a cross-sectional view of the vicinity of a circulation liquid chamber of the ink jet head.
Figure 7:
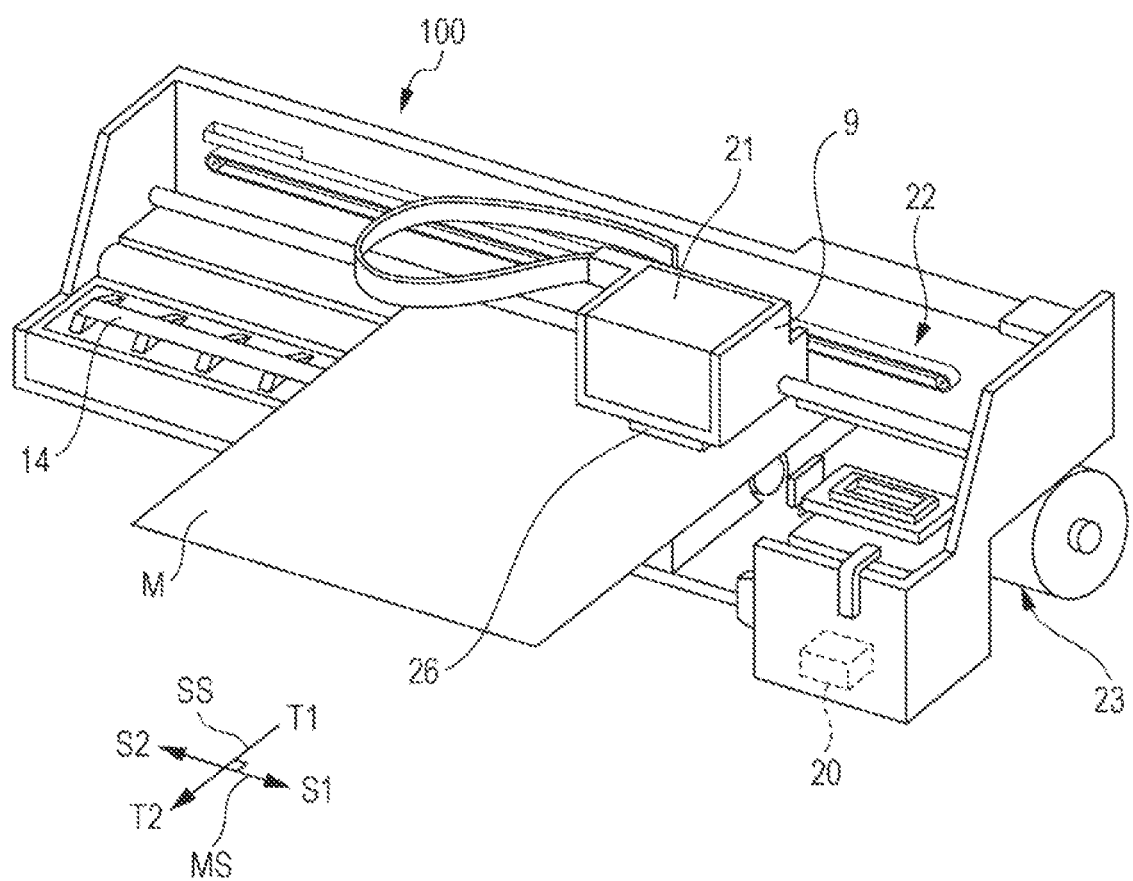
FIG. 7 is a perspective view showing the structure of the vicinity of the ink jet head of the recording apparatus.

Hereinafter, with reference to the drawings, a preferable embodiment of the recording apparatus of the present disclosure will be described in detail. FIG. 1 is a structural view of a recording apparatus of a preferable embodiment of the present disclosure. FIG. 2 is a cross-sectional view of an ink jet head. FIG. 3 is a partially exploded perspective view of the ink jet head. FIG. 4 is a cross-sectional view of a piezoelectric element. FIG. 5 is a view illustrating circulation of the ink composition in the ink jet head. FIG. 6 includes a plan view and a cross-sectional view of the vicinity of a circulation liquid chamber of the ink jet head. FIG. 7 is a perspective view showing one example of the structure of the vicinity of the ink jet head of the recording apparatus in FIG. 1.

A recording apparatus 100 is an ink jet type printing apparatus to eject the ink composition to a recording medium M.

As shown in FIG. 1, the recording apparatus 100 includes a control unit 20, an ink composition container 11 to receive the ink composition, an ink composition circulation tank 12 functioning as a subtank, and ink jet head 26, an IR heater 13, a platen heater 14, a curing heater 15, a cooling fan 16, a pre-heater 17, and a ventilation fan 18.

The ink composition received in the ink composition container 11 is configured to be supplied to the ink composition circulation tank 12 functioning as a subtank and then to be further supplied to the ink jet head 26 therefrom. In addition, although not shown in the drawing, the ink composition circulation tank 12 is configured to communicate with the ink jet head 26.

Accordingly, a circulation mechanism of the ink composition is formed. In addition, in the structure shown in FIG. 1, although only one circulation mechanism is provided for the ink composition, and one pair of the ink composition container 11 and the ink composition circulation tank 12 is provided, when a plurality of ink compositions is used, a plurality of circulation mechanisms is provided in accordance with the number of the ink compositions.

The ink jet head 26 and the ink composition circulation tank 12 partially form a circulation mechanism 75 which will be described later in detail.

At a flow path through which the ink composition is supplied from the ink composition circulation tank 12 to the ink jet head 26, a self sealing valve not shown is provided. In addition, although not shown in the drawing, at the downstream of this self sealing valve, at least one filter to trap foreign materials is provided.

The ink composition supplied from the ink composition circulation tank 12 to the ink jet head 26 is partially ejected from a nozzle N of the ink jet head 26, and the rest of the ink composition not ejected from the nozzle N is returned to the ink composition circulation tank 12.

The control unit 20 includes, for example, a processing circuit, such as a CPU (central processing unit) or a FPGA (field programmable gate array), and a memory circuit, such as a semiconductor memory, and collectively controls individual elements of the recording apparatus 100.

For example, the control unit 20 controls the operation of a transport mechanism to transport the recording medium M in a Y axis direction.

In addition, the control unit 20 controls the operation of a transfer mechanism to reciprocally transfer the ink jet head 26 in an X axis direction. The X axis direction is a direction to intersect the Y axis direction in which the recording medium M is transported. In general, the X axis direction is a direction orthogonal to the Y axis direction.

The transfer mechanism includes an approximately box type transporter to receive the ink jet head 26 and a transport belt to which the transporter is fixed.

The ink jet head 26 is a device to eject the ink composition so as to be adhered to the recording medium M. In particular, in this embodiment, the ink jet head 26 is a serial type ink jet head.

The recording apparatus 100 includes, as the primary heating device to perform the primary heating step of heating the ink composition adhered to the recording medium M, the IR heater 13, the platen heater 14, the pre-heater 17, and the ventilation fan 18. In the primary heating step, at least one of those mentioned above may be used.

As the primary heating device, for example, there may be used a heating mechanism including at least one of a conduction type, such as the platen heater 14 or the pre-heater 17, which conducts heat to the recording medium from a member in contact therewith, a radiation type, such as the IR heater 13, which radiates an electromagnetic wave to generate heat, and a ventilation type, such as the ventilation fan 18, which sends heated air to the recording medium.

When the IR heater 13 is used, the recording medium M can be heated from an ink jet head 26 side. Accordingly, although the ink jet head 26 is liable to be simultaneously heated, compared to the case in which the recording medium M is heated from a rear side thereof by the platen heater 14 or the like, the temperature can be increased without receiving the influence of the thickness of the recording medium M. In addition, when the platen heater 14 is used, the recording medium M can be heated from a side opposite to the ink jet head 26 side. Hence, the ink jet head 26 is relatively not likely to be heated.

The curing heater 15 is provided downstream in the transport direction of the recording medium M than the IR heater 13 and the platen heater 14 each functioning as the primary heating device and is a secondary heating device to perform the secondary heating step.

As the curing heater 15, for example, at least one of a conduction type, a radiation type, and a ventilation type may be used.

The recording apparatus 100 includes the cooling fan 16 to perform a cooling step. After the ink composition recorded on the recording medium M is heated and dried by the curing heater 15, since a recorded portion by the ink composition on the recording medium M is cooled by the cooling fan 16, for example, stickiness of the recorded portion by the ink composition can be effectively suppressed. In addition, even when a printed surface of a recorded matter thus manufactured is brought into contact with another member or another recorded matter, for example, unwilling disturbance of the recorded portion can be effectively prevented.

In addition, the recording apparatus 100 includes the pre-heater 17 to head the recording medium M in advance before the ink composition ejected from the ink jet head 26 is adhered to the recording medium M. In other words, at a position upstream in the transport direction of the recording medium M than a position at which the ink composition is applied to the recording medium M by the ink jet head 26, the pre-heater 17 is provided.

Accordingly, the primary heating step can be more preferably performed.

As the pre-heater 17, for example, a conduction type may be used.

In the structure shown in the drawing, the recording apparatus 100 includes the ventilation fan 18. Accordingly, the ink composition adhered to the recording medium M can be more effectively dried.

The ink jet head 26 ejects the ink composition supplied from the ink composition circulation tank 12 to the recording medium M from a plurality of nozzles N by the control of the control unit 20. Since each ink jet head 26 ejects the ink composition to the recording medium M in association with the transport of the recording medium M by the transport mechanism and reciprocal transfer of the transporter, a desired image is formed on the surface of the recording medium M. In addition, hereinafter, a direction orthogonal to the X-Y plane, such as a direction orthogonal to a plane parallel to the surface of the recording medium M, is represented by a Z axis direction. The ejection direction of the ink composition by each ink jet head 26 corresponds to the Z axis direction. The Z axis direction is typically a vertical direction.

As shown in FIG. 7, around the ink jet head 26 of the recording apparatus 100, there are provided the ink jet head 26, a housing 21 receiving the ink jet head 26, a carriage 9, the platen heater 14, a carriage transfer mechanism 22, a transport device 23, and the control unit 20. In a bottom surface of the ink jet head 26, nozzle lines not shown are disposed along a sub-scanning direction SS.

While the ink jet head 26 is transferred in one direction S1 or S2 of a main scanning direction MS, the recording apparatus 100 performs main scannings to eject the ink composition from the nozzles of the nozzle lines so as to be adhered to the recording medium M. In addition, the recording apparatus 100 performs sub-scannings to transfer the recording medium M in the sub-scanning direction SS. This recording apparatus is a serial type recording apparatus, and the main scannings and the sub-scannings are alternately repeated on the recording medium M for recording.

When a transfer distance of the recording medium by one sub-scanning in the sub-scanning direction is, for example, one fourth of the length of the nozzle line in the sub-scanning direction, 4 main scannings are performed on a region of the recording medium in the sub-scanning direction having a length corresponding to that of the one sub-scanning. In this case, on the same scanning region of the recording medium, the main scanning is performed 4 times. The number of the main scannings is, as described above, the number of the main scannings performed on the same scanning region of the recording medium. In the case described above, when the transfer distance of the recording medium by one sub-scanning in the sub-scanning direction is smaller, the number of the main scannings performed on the same scanning region of the recording medium is increased.

As shown in FIG. 5 and the like, the nozzles N of the ink jet head 26 are disposed in the Y axis direction. The nozzles N are separated in a first line L1 and a second line L2 disposed in parallel with a distance provided therebetween in the X axis direction. In each of the first line L1 and the second ling L2, the nozzles N are assembled to be linearly disposed in the Y axis direction. In addition, although the positions of the nozzles N in the first line L1 may be different from the positions of the nozzles N in the second line L2 in the Y axis direction, that is, although the nozzles N in the first line L1 and the nozzles N in the second line L2 may be disposed in a staggered arrangement, the structure in which the positions of the nozzles N in the first line L1 are made to coincide with the positions of the nozzles N in the second line L2 in the Y axis direction will be described by way of example for the convenience. In the ink jet head 26, a plane passing through a central axis parallel to the Y axis direction and being parallel to the Z axis direction, that is, a Y-Z plane, is represented by the "central plane O" in the following description.

As shown in FIGS. 2 and 3, the ink jet head 26 has the structure in which elements relating to each nozzle N of the first line L1 and elements relating to each nozzle N of the second line L2 are disposed in a plane symmetric manner with the central plane O interposed therebetween. That is, a first portion P1 at a positive side in the X axis direction and a second portion P2 at a negative side in the X axis direction of the ink jet head 26 with the central plane O interposed therebetween have substantially the same structure. The nozzles N of the first line L1 are formed in the first portion P1, and the nozzles N of the second line L2 are formed in the second portion P2. The central plane O corresponds to a boundary plane between the first portion P1 and the second portion P2.

As shown in FIGS. 2 and 3, the ink jet head 26 includes a flow path forming portion 30. The flow path forming portion 30 is a structural body to form a flow path which supplies the ink composition to the nozzles N. The flow path forming portion 30 has the structure in which a first flow path substrate 32 functioning as a communication plate and a second flow path substrate 34 functioning as a pressure chamber forming plate are laminated to each other. The first flow path substrate 32 and the second flow path substrate 34 are each a long plate-shaped member extending in the Y axis direction. On a surface Fa of the first flow path substrate 32 at a negative side in the Z axis direction, the second flow path substrate 34 is disposed using an adhesive or the like.

As shown in FIG. 2, on the surface Fa of the first flow path substrate 32, a vibration portion 42, piezoelectric elements 44, a protective member 46, and a housing portion 48 are provided besides the second flow path substrate 34. On the other hand, on a positive side of the first flow path substrate 32 in the Z axis direction, that is, on a surface Fb of the first flow path substrate 32 opposite to the surface Fa thereof, a nozzle plate 52 and vibration absorbers 54 are disposed. The elements of the ink jet head 26 are each approximately a long plate-shaped member extending in the Y axis direction as is the first flow path substrate 32 or the second flow path substrate 34, and the elements are bonded to each other with an adhesive or the like. The direction in which the first flow path substrate 32 and the second flow path substrate 34 are laminated to each other and the direction in which the first flow path substrate 32 and the nozzle plate 52 are laminated to each other may be understood as the Z axis direction.

The nozzle plate 52 is a plate-shaped member in which the nozzles N are formed and is disposed on the surface Fb of the first flow path substrate 32 using an adhesive or the like. The nozzles N are each a round penetrating hole through which the ink composition is allowed to pass. In the nozzle plate 52, the nozzles N forming the first line L1 and the nozzles N forming the second line L2 are formed. In more particular, in a region of the nozzle plate 52 at the positive side in the X axis direction with respect to the central plane O, the nozzles N of the first line L1 are formed along the Y axis direction, and in a region of the nozzle plate 52 at the negative side in the X axis direction with respect to the central plane O, the nozzles N of the second line L2 are formed along the Y axis direction. The nozzle plate 52 is a single plate-shaped member in which the nozzles N of the first line L1 are formed and the nozzles N of the second line L2 are formed. The nozzle plate 52 may be manufactured by processing a silicon single crystal substrate using semiconductor manufacturing techniques, that is, process techniques, such as dry etching and/or wet etching. However, for the manufacturing of the nozzle plate 52, at least one known material and/or at least one known manufacturing method may be arbitrarily used.

As shown in FIGS. 2 and 3, in each of the first portion P1 and the second portion P2 of the first flow path substrate 32, a space Ra, supply paths 61, and communication paths 63 are formed. The space Ra is formed to have a long shape along the Y axis direction in plan view, and the supply paths 61 and the communication paths 63 are penetrating holes formed for the respective nozzles N. The communication paths 63 are disposed in the Y axis direction in plan view, and the supply paths 61 are disposed in the Y axis direction between the space Ra and the communication paths 63. The supply paths 61 communicate with the space Ra. In addition, one arbitrary communication path 63 is overlapped with the nozzle N corresponding thereto in plan view. In particular, one arbitrary communication path 63 of the first portion P1 communicates with one nozzle N corresponding to the communication path 63 of the first line L1. As is the case described above, one arbitrary communication path 63 of the second portion P2 communicates with one nozzle N corresponding to the communication path 63 of the second line L2.

As shown in FIGS. 2 and 3, the second flow path substrate 34 is a plate-shaped member in which pressure chambers C are formed for each of the first portion P1 and the second portion P2. The pressure chambers C are disposed in the Y axis direction. The pressure chambers C are formed for the respective nozzles N and are each a long space along the X axis direction in plan view. As is the case of the nozzle plate 52 described above, the first flow path substrate 32 and the second flow path substrate 34 are manufactured by processing a silicon single crystal substrate using semiconductor manufacturing techniques or the like. However, for the manufacturing of the first flow path substrate 32 and the second flow path substrate 34, at least one known material and/or at least one known manufacturing technique may be arbitrarily used. As described above by way of example, the flow path forming portion 30 and the nozzle plate 52 each may include a substrate formed from silicon. Hence, for example, as described above by way of example, by using semiconductor manufacturing techniques, in the flow path forming portion 30 and the nozzle plate 52, fine flow paths can be advantageously formed with a high accuracy.

As shown in FIG. 2, on the surface of the second flow path substrate 34 opposite to the first flow path substrate 32, the vibration portion 42 is disposed. The vibration portion 42 is an elastically vibratable plate-shaped member, that is, is a vibration plate. In addition, when a plate-shaped member having a predetermined thickness is partially selectively removed in regions corresponding to the pressure chambers C, the second flow path substrate 34 and the vibration portion 42 may be integrally formed.

As shown in FIG. 2, the surface Fa of the first flow path substrate 32 and the vibration portion 42 face each other with a gap interposed therebetween in each pressure chamber C. The pressure chamber C is a space located between the surface Fa of the first flow path substrate 32 and the vibration portion 42, and a pressure change is generated in the ink composition filled in this space. The pressure chambers C are each, for example, a long space extending in the X axis direction and are formed for the respective nozzles N. In each of the first line L1 and the second line L2, the pressure chambers C are disposed in the Y axis direction. As shown in FIGS. 2 and 3, one end of one arbitrary pressure chamber C at a central plane O side is overlapped with the communication path 63 in plan view, and the other end thereof at the side opposite to the central plane O is overlapped with the supply path 61 in plan view. Hence, in each of the first portion P1 and the second portion P2, the pressure chamber C communicates with the nozzle N through the communication path 63 and also communicates with the space Ra through the supply path 61. In addition, when a throttle flow path having a throttled flow path width is formed in the pressure chamber C, a predetermined flow path resistance may also be applied.

As shown in FIG. 2, in each of the first portion P1 and the second portion P2, on a surface of the vibration portion 42 opposite to the pressure chamber C, the piezoelectric elements 44 for the respective nozzles N are provided. The piezoelectric element 44 is a passive element to be deformed by a drive signal supply. The piezoelectric elements 44 are disposed in the Y axis direction so as to correspond to the respective pressure chambers C. One arbitrary piezoelectric element 44 is, as shown in FIG. 4, a laminate in which a piezoelectric layer 443 is provided between a first electrode 441 and a second electrode 442. In addition, one of the first electrode 441 and the second electrode 442 may also be used as a common electrode which is a continuous electrode provided for the piezoelectric elements 44. A portion at which the first electrode 441, the piezoelectric layer 443, and the second electrode 442 are overlapped with each other in this order functions as the piezoelectric element 44. In addition, a portion which is deformed by the drive signal supply, that is, an active portion to vibrate the vibration portion 42, may be defined as the piezoelectric element 44. As described above, the ink jet head 26 includes first piezoelectric elements and second piezoelectric elements. For example, the first piezoelectric element is a piezoelectric element 44 at one side in the X axis direction with respect to the central plane O and is, for example, a piezoelectric element 44 at a right side in FIG. 2, and the second piezoelectric element is a piezoelectric element 44 at the other side in the X axis direction with respect to the central plane O and is, for example, a piezoelectric element 44 at a left side in FIG. 2. When the vibration portion 42 vibrates in association with the deformation of the piezoelectric element 44, since the pressure in the pressure chamber C is changed, the ink composition filled in the pressure chamber C is ejected through the communication path 63 and the nozzle N.

The protective member 46 is a plate-shaped member to protect the piezoelectric elements 44 and is provided on the surface of the vibration portion 42 or on the surface of the second flow path substrate 34. Although a material of the protective member 46 and a manufacturing method therefor may be arbitrarily selected, as is the case of the first flow path substrate 32 or the second flow path substrate 34, for example, the protective member 46 may be formed by processing a silicon single crystal substrate by semiconductor manufacturing techniques. In a concave portion formed in the surface of the protective member 46 at a vibration portion 42 side, the piezoelectric elements 44 are received.

To a surface of the vibration portion 42 opposite to the flow path forming portion 30 or a surface of the flow path forming portion 30, one end of a circuit board 28 is bonded. The circuit board 28 is a flexible surface-mounted component in which wires not shown are formed to electrically couple the control unit 20 and the ink jet head 26. One end of the circuit board 28 extended outside through an opening formed in the protective member 46 and an opening formed in the housing portion 48 is coupled to the control unit 20.

For example, a flexible circuit board 28, such as an FPC (flexible printed circuit) or an FFC (flexible flat cable), is preferably used.

The housing portion 48 is a case to store the pressure chambers C and the ink composition to be supplied to the nozzles N. A positive side surface of the housing portion 48 in the Z axis direction is bonded to the surface Fa of the first flow path substrate 32 by an adhesive or the like. For manufacturing of the housing portion 48, a known technique and a known manufacturing method may be arbitrarily used. For example, the housing portion 48 may be formed by injection molding.

As shown in FIG. 2, in the housing portion 48, a space Rb is formed for each of the first portion P1 and the second portion P2. The space Rb of the housing portion 48 and the space Ra of the first flow path substrate 32 communicate with each other. A space formed by the space Ra and the space Rb functions as a liquid reservoir R to store the ink composition to be supplied to the pressure chambers C. The liquid reservoir R is a common liquid chamber commonly used for the nozzles N. The liquid reservoir R is formed in each of the first portion P1 and the second portion P2. The liquid reservoir R in the first portion P1 is located at a positive side in the X axis direction with respect to the central plane O, and the liquid reservoir R in the second portion P2 is located at a negative side in the X axis direction with respect to the central plane O. In a surface of the housing portion 48 opposite to the first flow path substrate 32, inlet ports 482 are each formed to introduce the ink composition to be supplied from the ink composition circulation tank 12 to the liquid reservoir R. Although not shown in the drawing, a heater to heat the ink composition may be provided on a wall surface to define the space Rb.

As shown in FIG. 2, on the surface Fb of the first flow path substrate 32, the vibration absorbers 54 are provided respectively for the first portion P1 and the second portion P2. The vibration absorber 54 is a flexible film absorbing the change in pressure of the ink composition in the liquid reservoir R, that is, is a compliance substrate. As shown in FIG. 3, the vibration absorber 54 is disposed on the surface Fb of the first flow path substrate 32 so as to seal the space Ra of the first flow path substrate 32 and the supply paths 61, so that a wall surface of the liquid reservoir R, in more particular, a bottom surface thereof, is formed.

As shown in FIG. 2, in the surface Fb of the first flow path substrate 32 facing the nozzle plate 52, a circulation liquid chamber 65 is formed. The circulation liquid chamber 65 is a long bottom-sealed hole extending in the Y axis direction in plan view. By the nozzle plate 52 bonded to the surface Fb of the first flow path substrate 32, an opening of the circulation liquid chamber 65 is sealed.

As shown in FIG. 5, the circulation liquid chamber 65 is continuously provided for the nozzles N along the first line L1 and the second line L2. In particular, between the arrangement of the nozzles N of the first line L1 and the arrangement of the nozzles N of the second line L2, the circulation liquid chamber 65 is formed. Hence, as shown in FIG. 2, the circulation liquid chamber 65 is located between the communication paths 63 of the first portion P1 and the communication paths 63 of the second portion P2. As described above, the flow path forming portion 30 is a structural body in which first pressure chambers each functioning as the pressure chamber C and first communication paths each functioning as the communication path 63 of the first portion P1, second pressure chambers each functioning as the pressure chamber C and second communication paths each functioning as the communication path 63 of the second portion P2, and the circulation liquid chamber 65 located between the communication paths 63 of the first portion P1 and the communication paths 63 of the second portion P2 are formed. As shown in FIG. 2, the flow path forming portion 30 includes partition portions 69 each of which is a wall-shaped portion to partition between the circulation liquid chamber 65 and the communication paths 63.

In addition, as described above, in each of the first portion P1 and the second portion P2, the pressure chambers C and the piezoelectric elements 44 are disposed in the Y axis direction. Hence, it may also be said that the circulation liquid chamber 65 is continuously extended in the Y axis direction for the pressure chambers C or the piezoelectric elements 44 of each of the first portion P1 and the second portion P2. In addition, it may also be said that the circulation liquid chamber 65 and the liquid reservoir R are extended in the Y axis direction with a gap interposed therebetween, and in the gap described above, the pressure chambers C, the communication paths 63, and the nozzles N are located.

As shown in FIG. 6, one nozzle N includes a first section n1 and a second section n2. The first section n1 and the second section n2 are coaxial circular spaces formed to communicate with each other. The second section n2 is located at a flow path forming portion 30 side with respect to the first section n1. An inside diameter d2 of the second section n2 is larger than an inside diameter d1 of the first section n1. According to the nozzle N formed to have a stepwise structure as described above, the flow path resistance of each nozzle N can be advantageously set to have desired characteristics. In addition, as shown in FIG. 6, a central axis Qa of each nozzle N is located at a side opposite to the circulation liquid chamber 65 with respect to a central axis Qb of the communication path 63.

As shown in FIG. 6, on a surface of the nozzle plate 52 facing the flow path forming portion 30, circulation paths 72 are formed for each of the first portion P1 and the second portion P2. The circulation paths 72 of the first portion P1 correspond to the respective nozzles N of the first line L1. The circulation paths 72 of the second portion P2 correspond to the respective nozzles N of the second line L2.

Each circulation path 72 is a groove portion extending in the X axis direction, that is, is a long bottom-sealed hole, and functions as a flow path to flow the ink composition. The circulation path 72 is formed at a position apart from the nozzle N and, in particular, is formed at a circulation liquid chamber 65 side with respect to the nozzle N corresponding to this circulation path 72. For example, by semiconductor manufacturing techniques which are processing techniques, such as dry etching and/or wet etching, the nozzles N, in particular, the second sections n2 and the circulation paths 72 can be collectively formed by a common process.

As shown in FIG. 6, each circulation path 72 is linearly formed to have a flow path width Wa equivalent to the inside diameter d2 of the second section n2 of the nozzle N. In addition, the flow path width Wa of the circulation path 72, that is, the dimension of the circulation path 72 in the Y axis direction, is smaller than a flow path width Wb of the pressure chamber C, that is, the dimension of the pressure chamber C in the Y axis direction. Hence, compared to the structure in which the flow path width Wa of the circulation path 72 is larger than the flow path width Wb of the pressure chamber C, the flow path resistance of the circulation path 72 can be increased. On the other hand, a depth of the circulation path 72 with respect to the surface of the nozzle plate 52 is constant overt the entire length. In particular, each circulation path 72 is formed to have a depth equivalent to that of the second section n2 of the nozzle N. According to the structure described above, compared to the structure in which the circulation path 72 and the second section n2 are formed to have different depths from each other, the circulation path 72 and the second section n2 are advantageously easily formed. In addition, the "depth" of the flow path indicates a depth of the flow path in the Z axis direction.

One arbitrary circulation path 72 in the first portion P1 is located at a circulation liquid chamber 65 side with respect to the nozzle N corresponding to this circulation path 72 of the first line L1. In addition, one arbitrary circulation path 72 in the second portion P2 is located at a circulation liquid chamber 65 side with respect to the nozzle N corresponding to this circulation path 72 of the second line L2. In addition, one end of each circulation path 72 opposite to the central plane O, that is, one end of the circulation path 72 at a communication path 63 side, is overlapped with one communication path 63 corresponding to this circulation path 72 in plan view. That is, the circulation path 72 communicates with the communication path 63. On the other hand, one end of each circulation path 72 at a central plane O side, that is, one end of the circulation path 72 at a circulation liquid chamber 65 side, is overlapped with the circulation liquid chamber 65 in plan view. That is, the circulation path 72 communicates with the circulation liquid chamber 65. As described above, the communication paths 63 communicate with the circulation liquid chamber 65 through the circulation paths 72. Accordingly, as shown by a dotted arrow in FIG. 6, the ink composition in each communication path 63 is supplied in the circulation liquid chamber 65 through the corresponding circulation path 72. That is, the communication paths 63 of the first line L1 and the communication paths 63 of the second line L2 commonly communicate with one circulation liquid chamber 65.

In FIG. 6, a flow path length La of a portion of one arbitrary circulation path 72 overlapped with the circulation liquid chamber 65, a flow path length Lb of a portion of the circulation path 72 overlapped with the communication path 63, and a flow path length Lc of a portion of the circulation path 72 overlapped with the partition portion 69 of the flow path forming portion 30 are shown. The flow path length Lc corresponds to the thickness of the partition portion 69. The partition portion 69 functions as a throttle portion of the circulation path 72. Hence, as the flow path length Lc corresponding to the thickness of the partition portion 69 is increased, the flow path resistance of the circulation path 72 is increased. In this embodiment, the relationship in which the flow path length La is larger than the flow path length Lb, and the flow path length La is larger than the flow path length Lc is satisfied. Furthermore, in this embodiment, the relationship in which the flow path length Lb is larger than the flow path length Lc is also satisfied. According to the structure described above, compared to the structure in which the flow path length La ands the flow path length Lb are smaller than the flow path length Lc, the ink composition is advantageously likely to flow from the communication path 63 to the circulation liquid chamber 65 through the circulation path 72.

As described above, in this embodiment, the pressure chamber C indirectly communicates with the circulation liquid chamber 65 through the communication path 63 and the circulation path 72. That is, the pressure chamber C and the circulation liquid chamber 65 are not allowed to directly communicate with each other. In the structure described above, when the pressure in the pressure chamber C is changed by the operation of the piezoelectric element 44, the ink composition flowing in the communication path 63 is partially ejected outside from the nozzle N, and the rest of the ink composition partially flows into the circulation liquid chamber 65 from the communication path 63 through the circulation path 72. In this embodiment, the inertances of the communication path 63, the nozzle N, and the circulation path 72 are selected so that, of the ink composition flowing through the communication path 63 by one drive of the piezoelectric element 44, an amount (hereinafter, referred to as the "ejection amount") of the ink composition to be ejected through the nozzle N is larger than an amount (hereinafter, referred to as the "circulation amount") of the ink composition to flow into the circulation liquid chamber 65 through the circulation path 72. Hereinafter, of the ink composition flowing through the communication path 63 by one drive of the piezoelectric element 44, the amount of the ink composition to be ejected through the nozzle N is called the "ejection amount", and the amount of the ink composition to flow into the circulation liquid chamber 65 through the circulation path 72 is called the "circulation amount". It may also be said that, when the case in which all the piezoelectric elements 44 are simultaneously driven is supposed, the total of the circulation amounts flowing into the circulation liquid chamber 65 from the communication paths 63 is larger than the total of the ejection amounts by the nozzles N.

In particular, the flow path resistance of each of the communication path 63, the ink composition, and the circulation path 72 is determined so that a rate of the circulation amount of the ink composition to the amount of the ink composition flowing through the communication path 63 is 70% or more. According to the structure described above, while the ejection amount of the ink composition is secured, the ink composition in the vicinity of the nozzle N can be effectively circulated into the circulation liquid chamber 65. In general, as the flow path resistance of the circulation path 72 is increased, although the circulation amount is decreased, the ejection amount tends to be increased, and in addition, as the flow path resistance of the circulation path 72 is decreased, although the circulation amount is increased, the ejection amount tends to be decreased.

The recording apparatus 100 includes a circulation mechanism 75.

The circulation mechanism 75 is a mechanism to circulate the ink composition in the circulation liquid chamber 65.

The circulation mechanism 75 sends the ink composition in the circulation liquid chamber 65 to the ink composition circulation tank 12 so that the ink composition received in the ink composition circulation tank 12 and the ink composition supplied from the inside of the ink composition container 11 are mixed together.

The circulation mechanism 75 may include, for example, a suction mechanism, such as a pump, to suck the ink composition from the circulation liquid chamber 65, a filter mechanism to trap air bubbles and foreign materials mixed in the ink composition, and a heating mechanism to suppress a viscosity increase by heating the ink composition. The ink composition is supplied from the circulation mechanism 75 to the liquid reservoir R through the inlet port 482. As described above, in this embodiment, the ink composition is circulated in a route from the liquid reservoir R→supply path 61→pressure chamber C→communication path 63→circulation path 72→circulation liquid chamber 65→circulation mechanism 75→ink composition circulation tank 12→inlet port 482→liquid reservoir R.

In the route described above, the route from the communication path 63→circulation path 72→circulation liquid chamber 65→circulation mechanism 75→ink composition circulation tank 12 corresponds to a circulation return path. In the circulation, the flow of the ink composition in the circulation return path is particularly called the "return".

In each of the drawings described above, the ink composition supplied in the ink jet head 26 is not ejected from the nozzle N, is discharged outside of the ink jet head 26 through the circulation return path, and is then returned to the ink composition circulation tank 12. That is, the route described above is a circulation return path to return the ink composition from the ink jet head 26 to the ink composition circulation tank 12. The ink composition returned to the ink composition circulation tank 12 is again supplied to the ink jet head 26. In this case, inside and outside the ink jet head 26, the ink composition can be circulated, and the generation of foreign materials of the ink composition can be preferably further suppressed.

In addition, in the case in which the recording apparatus 100 has a circulation path to circulate the ink composition, the circulation path described above indicates a broad-sense circulation path including an entire path to circulate the ink composition not only between the ink composition circulation tank 12 and the ink jet head 26 but also in the ink jet head 26. The circulation path 72 shown in FIG. 5 and the like is a narrow-sense circulation path which is a part of the broad-sense circulation path described above.

In addition, the ink composition circulation tank 12 may be provided in the form of a tank and may have a junction at which the ink composition returned through the circulation return path is able to join the ink composition discharged from the ink composition container 11.

In this embodiment, as shown in FIG. 5, the circulation mechanism 75 sucks the ink composition from two sides of the circulation liquid chamber 65 in the Y axis direction. That is, the circulation mechanism 75 sucks the ink composition from the vicinity of a negative end of the circulation liquid chamber 65 in the Y axis direction and the ink composition from the vicinity of a positive end of the circulation liquid chamber 65 in the Y axis direction. In addition, in the structure in which the ink composition is sucked only from the vicinity of one end of the circulation liquid chamber 65 in the Y axis direction, the difference in pressure of the ink composition is generated between the two ends of the circulation liquid chamber 65, and due to the pressure difference in the circulation liquid chamber 65, the pressure of the ink composition in the communication path 63 may be changed in accordance with the position in the Y axis direction. As a result, the ejection characteristics, such as the ejection amount and the ejection rate, of the ink composition from each nozzle N may be changed in accordance with the position in the Y axis direction. On the contrary, in this embodiment, since the ink composition is sucked from the two sides of the circulation liquid chamber 65, the pressure difference in the circulation liquid chamber 65 is suppressed. Hence, the ejection characteristics of the ink composition can be highly precisely approximated to each other over the nozzles N disposed in the Y axis direction. However, when the pressure difference in the circulation liquid chamber 65 in the Y axis direction causes no serious problems, the structure in which the ink composition is sucked only from one end of the circulation liquid chamber 65 may also be used.

As described above, the circulation path 72 and the communication path 63 are overlapped with each other in plan view, and the communication path 63 and the pressure chamber C are overlapped with each other in plan view. Hence, the circulation path 72 and the pressure chamber C are overlapped with each other in plan view. On the other hand, as shown in FIGS. 5 and 6, the circulation liquid chamber 65 and the pressure chamber C are not overlapped with each other in plan view. In addition, as shown in FIG. 2, since the piezoelectric element 44 is formed over the entire pressure chamber C in the X axis direction, although the circulation path 72 and the piezoelectric element 44 are overlapped with each other in plan view, the circulation liquid chamber 65 and the piezoelectric element 44 are not overlapped with each other in plan view. That is, the pressure chamber C or the piezoelectric element 44 is overlapped with the circulation path 72 in plan view but is not overlapped with the circulation liquid chamber 65 in plan view. Hence, for example, compared to the structure in which the pressure chamber C or the piezoelectric element 44 is not overlapped with the circulation path 72 in plan view, the ink jet head 26 can be advantageously formed to have a reduced size.

Heretofore, although the preferable embodiments of the present disclosure have been described, the present disclosure is not limited thereto.

For example, a recording apparatus to which the present disclosure is applied is not limited to that described above.

In more particular, for example, in the embodiment described above, although the structure including the circulation mechanism to circulate the ink composition has been mainly described, the recording apparatus to which the present disclosure is applied may include no circulation mechanism. When the recording apparatus includes no circulation mechanism, a simple recording apparatus may be preferably formed.

In addition, in the embodiment described above, although the recording apparatus including a serial type ink jet head as the ink jet head has been mainly described, the ink jet head may also be a line type ink jet head.

In addition, the recording method of the present disclosure may further include another step besides the steps described above.

In addition, in the embodiment described above, although the case in which the steps are performed by the same apparatus has been mainly described, some of the steps of the recording method of the present disclosure may be performed using a different apparatus. In more particular, an apparatus to perform the primary heating step may be an apparatus different from an apparatus including the ink jet head to perform the adhesion step.

EXAMPLES

Next, concrete examples of the present disclosure will be described.

3. Preparation of Ink Composition

Preparation Examples 1 to 28

Individual components were mixed together to have the compositions shown in Tables 1 and 2, so that ink compositions were obtained. In addition, as a pigment functioning as a colorant, by using a dispersant formed from a styrene-acrylic-based resin not shown in the table, a pigment dispersion liquid was prepared in advance such that a pigment and the dispersant at a mass ratio of 1:0.5 were mixed with water and then sufficient stirred by a bead mill, and this pigment dispersion liquid was used for the ink preparation.

The compositions of the ink compositions of Preparation Examples 1 to 28 are collectively shown in Tables 1 and 2. In addition, in Tables 1 and 2, C.I. Pigment Blue 15:3 as the colorant is represented by "PB15:3", a styrene-acrylic resin (manufactured by BASF, solid component of Joncryl 631) is represented by "J631", a polyolefin wax (manufactured by BYK, solid component of Aquacer 515) is represented by "WAX1", neopentyl glycol as the specific organic compound is represented by "NPG", pinacol as the specific organic compound is represented by "PIN", 1,2-cyclohexanediol as the specific organic compound is represented by "1,2-CHD", ε-caprolactam as the specific organic compound is represented by "CL", propylene glycol as the organic solvent is represented by "PG", 1,3-butanediol as the organic solvent is represented by "1,3-BD", Silface SAG002 (manufactured by Nisshin Chemical Industry Co., Ltd.) which is a silicone-based surfactant having an HLB value of 12 is represented by "SAG002", Silface SAG005 (manufactured by Nisshin Chemical Industry Co., Ltd.) which is a silicone-based surfactant having an HLB value of 7, that is, is the specific surfactant, is represented by "SAG005", Silface SAG021 (manufactured by Nisshin Chemical Industry Co., Ltd.) which is a silicone-based surfactant having an HLB value of 3, that is, the specific surfactant, is represented by "SAG021", Disponil SUS IC 875 (manufactured by BASF) as a sulfonic acid type anionic surfactant is represented by "IC875", 2,5-dimethyl-2,5-hexanediol as one of other organic compounds is represented by "OC1", and trimethylolpropane as one of other organic compounds is represented by "OC2". In addition, the surface tensions of the ink compositions at 25° C. of Preparation Examples measured by Wilhelmy method were all in a range of 30 to 40 mN/m. In addition, the viscosities of the ink compositions at 25° C. of Preparation Examples measured in accordance with JIS 28809 using a vibration type viscometer were all in a range of 3 to 8 mPas. In addition, the melting point, the standard boiling point, and the solubility in water at 25° C. of each of the specific organic compounds, the organic solvents, and the other organic compounds used in Preparation Examples described above are collectively shown in Table 3.

TABLE 1

| | CONTENT (PERCENT BY MASS) | | | | | | | | | |
|---|---|---|---|---|---|---|---|---|---|---|
| | | | | SPECIFIC ORGANIC COMPOUND | | | | ORGANIC SOLVENT | | SURFACTANT | |
| | COLORANT | RESIN | WAX | | | | | | | SAG002 | SAG005 |
| | PB15:3 | J631 | WAX1 | NPG | PIN | 1,2-CHD | CL | PG | 1,3-BD | (HLB = 12) | (HLB = 7) |
| PREPARATION EXAMPLE 1 | 4.0 | 1.0 | 1.0 | 10.0 | — | — | — | — | — | — | — |
| PREPARATION EXAMPLE 2 | 4.0 | 1.0 | 1.0 | — | 10.0 | — | — | — | — | — | — |

TABLE 1-continued

| | CONTENT (PERCENT BY MASS) | | | | | | | | | | | | | | | | |
|---|---|---|---|---|---|---|---|---|---|---|---|---|---|---|---|---|---|
| | COLORANT | RESIN | WAX | SPECIFIC ORGANIC COMPOUND | | | | ORGANIC SOLVENT | | SURFACTANT | | | | OTHER ORGANIC COMPOUNDS | | | |
| | PB15:3 | J631 | WAX1 | NPG | PIN | 1,2-CHD | CL | PG | 1,3-BD | SAG002 (HLB = 12) | SAG005 (HLB = 7) | SAG021 (HLB = 3) | IC875 | OC1 | OC2 | WATER | TOTAL |
| PREPARATION EXAMPLE 3 | 4.0 | 1.0 | 1.0 | — | — | 10.0 | — | — | — | — | — | 0.1 | 0.9 | — | — | BALANCE | 100 |
| PREPARATION EXAMPLE 4 | 4.0 | 1.0 | 1.0 | — | — | — | 10.0 | — | — | — | — | 0.1 | 0.9 | — | — | BALANCE | 100 |
| PREPARATION EXAMPLE 5 | 4.0 | 1.0 | 1.0 | — | — | — | — | — | — | — | — | 0.1 | 0.9 | 10.0 | — | BALANCE | 100 |
| PREPARATION EXAMPLE 6 | 4.0 | 1.0 | 1.0 | — | — | — | — | — | — | — | — | 0.1 | 0.9 | — | 10.0 | BALANCE | 100 |
| PREPARATION EXAMPLE 7 | 4.0 | 1.0 | 1.0 | 2.0 | — | — | — | — | — | — | — | 0.1 | 0.9 | — | — | BALANCE | 100 |
| PREPARATION EXAMPLE 8 | 4.0 | 1.0 | 1.0 | 20.0 | — | — | — | — | — | — | — | 0.1 | 0.9 | — | — | BALANCE | 100 |
| PREPARATION EXAMPLE 9 | 4.0 | 1.0 | 1.0 | 2.0 | — | — | — | 8.0 | — | — | — | 0.1 | 0.9 | — | — | BALANCE | 100 |
| PREPARATION EXAMPLE 10 | 4.0 | 1.0 | 1.0 | — | 2.0 | — | — | 8.0 | — | — | — | 0.1 | 0.9 | — | — | BALANCE | 100 |
| PREPARATION EXAMPLE 11 | 4.0 | 1.0 | 1.0 | — | — | 2.0 | — | 8.0 | — | — | — | 0.1 | 0.9 | — | — | BALANCE | 100 |
| PREPARATION EXAMPLE 12 | 4.0 | 1.0 | 1.0 | — | — | — | 2.0 | 8.0 | — | — | — | 0.1 | 0.9 | — | — | BALANCE | 100 |
| PREPARATION EXAMPLE 13 | 4.0 | 1.0 | 1.0 | — | — | — | — | 8.0 | — | — | — | 0.1 | 0.9 | 2.0 | — | BALANCE | 100 |
| PREPARATION EXAMPLE 14 | 4.0 | 1.0 | 1.0 | — | — | — | — | 8.0 | — | — | — | 0.1 | 0.9 | — | 2.0 | BALANCE | 100 |

TABLE 2

| | CONTENT (PERCENT BY MASS) | | | | | | | | | | |
|---|---|---|---|---|---|---|---|---|---|---|---|
| | COLORANT | RESIN | WAX | SPECIFIC ORGANIC COMPOUND | | | | ORGANIC SOLVENT | | SURFACTANT | |
| | PB15:3 | J631 | WAX1 | NPG | PIN | 1,2-CHD | CL | PG | 1,3-BD | SAG002 (HLB = 12) | SAG005 (HLB = 7) |
| PREPARATION EXAMPLE 15 | 4.0 | 1.0 | 1.0 | — | — | — | — | 10.0 | — | — | — |
| PREPARATION EXAMPLE 16 | 4.0 | 1.0 | 1.0 | — | — | — | — | 20.0 | — | — | — |

TABLE 2-continued

| | | | | | | | | | | |
|---|---|---|---|---|---|---|---|---|---|---|
| PREPARATION EXAMPLE 17 | 4.0 | 1.0 | 1.0 | — | — | — | — | — | 10.0 | — | — |
| PREPARATION EXAMPLE 18 | 4.0 | 1.0 | 1.0 | — | — | — | — | — | 20.0 | — | — |
| PREPARATION EXAMPLE 19 | 4.0 | 1.0 | 1.0 | 10.0 | — | — | — | — | — | 1.0 | — |
| PREPARATION EXAMPLE 20 | 4.0 | 1.0 | 1.0 | 10.0 | — | — | — | — | — | — | 1.0 |
| PREPARATION EXAMPLE 21 | 4.0 | 1.0 | 1.0 | 10.0 | — | — | — | — | — | — | 0.1 |
| PREPARATION EXAMPLE 22 | 4.0 | 1.0 | 1.0 | 10.0 | — | — | — | — | — | — | — |
| PREPARATION EXAMPLE 23 | 4.0 | 1.0 | 1.0 | 10.0 | — | — | — | — | — | — | — |
| PREPARATION EXAMPLE 24 | 4.0 | 1.0 | 1.0 | 5.0 | — | — | — | 10.0 | — | — | — |
| PREPARATION EXAMPLE 25 | 4.0 | 1.0 | 1.0 | — | 5.0 | — | — | 10.0 | — | — | — |
| PREPARATION EXAMPLE 26 | 4.0 | 1.0 | 1.0 | — | — | 5.0 | — | 10.0 | — | — | — |
| PREPARATION EXAMPLE 27 | 4.0 | 1.0 | 1.0 | — | — | — | 5.0 | 10.0 | — | — | — |
| PREPARATION EXAMPLE 28 | 4.0 | 1.0 | 1.0 | 5.0 | — | — | — | — | 10.0 | — | — |

| | CONTENT (PERCENT BY MASS) | | | | | |
|---|---|---|---|---|---|---|
| | SURFACTANT | | OTHER ORGANIC COMPOUNDS | | | |
| | SAG021 (HLB = 3) | IC875 | OC1 | OC2 | WATER | TOTAL |
| PREPARATION EXAMPLE 15 | 0.1 | 0.9 | — | — | BALANCE | 100 |
| PREPARATION EXAMPLE 16 | 0.1 | 0.9 | — | — | BALANCE | 100 |
| PREPARATION EXAMPLE 17 | 0.1 | 0.9 | — | — | BALANCE | 100 |
| PREPARATION EXAMPLE 18 | 0.1 | 0.9 | — | — | BALANCE | 100 |
| PREPARATION EXAMPLE 19 | — | — | — | — | BALANCE | 100 |
| PREPARATION EXAMPLE 20 | — | — | — | — | BALANCE | 100 |
| PREPARATION EXAMPLE 21 | — | 0.9 | — | — | BALANCE | 100 |
| PREPARATION EXAMPLE 22 | 1.0 | — | — | — | BALANCE | 100 |
| PREPARATION EXAMPLE 23 | — | 1.0 | — | — | BALANCE | 100 |
| PREPARATION EXAMPLE 24 | 0.1 | 0.9 | — | — | BALANCE | 100 |
| PREPARATION EXAMPLE 25 | 0.1 | 0.9 | — | — | BALANCE | 100 |
| PREPARATION EXAMPLE 26 | 0.1 | 0.9 | — | — | BALANCE | 100 |
| PREPARATION EXAMPLE 27 | 0.1 | 0.9 | — | — | BALANCE | 100 |
| PREPARATION EXAMPLE 28 | 0.1 | 0.9 | — | — | BALANCE | 100 |

TABLE 3

| | MELTING POINT [° C.] | STANDARD BOILING POINT [° C.] | SOLUBILITY [g/100 g OF WATER] |
|---|---|---|---|
| NEOPENTYL GLYCOL (NPG) | 128 | 210 | 80 |
| PINACOL (PIN) | 43 | 174 | ∞ |
| 1,2-CYCLOHEXANEDIOL (1,2-CHD) | 104 | 236 | >100 |
| ε-CAPROLACTAM (CL) | 70 | 267 | >100 |
| PROPYLENE GLYCOL (PG) | −59 | 188 | ∞ |
| 1,3-BUTANEDIOL (1,3-BD) | −50 | 203 | ∞ |
| 2,5-DIMETHYL-2,5-HEXANEDIOL (OC1) | 87 | 215 | 14 |
| TRIMETHYLOLPROPANE (OC2) | 61 | 292 | >100 |

4. Manufacturing of Recorded Matter

Example 1

First, an SC-40650 printer manufactured by Seiko PMC Corporation was modified to have the structure shown in FIGS. 1 to 6, so that a recording apparatus having 360 nozzles and a nozzle density of 360 dpi in a nozzle line was prepared. A circulation mechanism was fitted to an ink jet head. In this recording apparatus, an ink composition container to receive the ink composition prepared in Preparation Example 1 described above was provided.

Next, the ink composition was supplied from the ink composition container to the ink jet head through an ink composition circulation tank.

Subsequently, while being circulated in a flow path of the circulation mechanism, the ink composition was ejected from the ink jet head and was then heated by a primary heating device and a secondary heating device, so that a recorded matter having a recorded portion with a solid printed-pattern was obtained. In more particular, while a poly(ethylene terephthalate)-made film (PET50A, manufactured by Lintec Corporation) functioning as a recording medium was transported by a transport mechanism, the ink composition was ejected on the recording medium to form a solid printed pattern, and immediately after this pattern formation, the recording medium was heated to have a surface temperature of 35° C. by controlling a platen heater functioning as the primary heating device and was then further heated to have a surface temperature of 80° C. by a curing heater functioning as the secondary heating device provided downstream of the primary heating device, so that the recorded matter was obtained. The manufacturing of the recorded matter was performed by 4-pass recording in which one sub-scanning distance was set to one fourth of the length of the nozzle line, and the ink was adhered to the same region by 4 main scannings. In addition, the adhesion amount of the ink composition on each portion of the recording medium was set to 10 mg/inch$^2$.

Examples 2 to 8

Except for that the type of ink composition was set as shown in Table 4, a recorded matter was manufactured in a manner similar to that of the above Example 1.

Example 9

Except for that by using a recording apparatus including no circulation mechanism, the ink was not circulated, a recorded matter was manufactured in a manner similar to that of the above Example 1.

Examples 10 to 30

Except for that the type of ink composition and the heating temperature by the primary heating device were set as shown in Tables 4 and 5, a recorded matter was manufactured in a manner similar to that of the above Example 9.

Comparative Examples 1 to 18

Except for that the type of ink composition, the use of a heating treatment by the primary heating device, and the heating temperature thereby were set as shown in Table 5, a recorded matter was manufactured in a manner similar to that of the above Example 9. In addition, in Example in which no primary heating step was performed, the primary heating was not performed by stopping the operation of the platen heater.

The manufacturing conditions of the recorded matters of the above Examples are collectively shown in Tables 4 and 5. In addition, in the column of the type of ink composition shown in each of Tables 4 and 5, the ink composition prepared in Preparation Example 1 is represented by ink 1, and the inks prepared in Preparation Examples 2 to 28 are represented by inks 2 to 28, respectively.

TABLE 4

| | PRIMARY HEATING STEP | | | |
| --- | --- | --- | --- | --- |
| | INK COMPO- SITION | YES or NO | SURFACE TEMPERATURE OF RECORDING MEDIUM [° C.] | CIRCU- LATION FUNC- TION |
| EXAMPLE 1 | INK 1 | YES | 35 | YES |
| EXAMPLE 2 | INK 2 | YES | 35 | YES |
| EXAMPLE 3 | INK 3 | YES | 35 | YES |
| EXAMPLE 4 | INK 4 | YES | 35 | YES |
| EXAMPLE 5 | INK 9 | YES | 35 | YES |
| EXAMPLE 6 | INK 10 | YES | 35 | YES |
| EXAMPLE 7 | INK 11 | YES | 35 | YES |
| EXAMPLE 8 | INK 12 | YES | 35 | YES |
| EXAMPLE 9 | INK 1 | YES | 35 | NO |
| EXAMPLE 10 | INK 2 | YES | 35 | NO |
| EXAMPLE 11 | INK 3 | YES | 35 | NO |
| EXAMPLE 12 | INK 4 | YES | 35 | NO |
| EXAMPLE 13 | INK 7 | YES | 35 | NO |
| EXAMPLE 14 | INK 8 | YES | 35 | NO |
| EXAMPLE 15 | INK 9 | YES | 35 | NO |
| EXAMPLE 16 | INK 10 | YES | 35 | NO |
| EXAMPLE 17 | INK 11 | YES | 35 | NO |
| EXAMPLE 18 | INK 12 | YES | 35 | NO |
| EXAMPLE 19 | INK 19 | YES | 35 | NO |
| EXAMPLE 20 | INK 20 | YES | 35 | NO |
| EXAMPLE 21 | INK 21 | YES | 35 | NO |
| EXAMPLE 22 | INK 22 | YES | 35 | NO |
| EXAMPLE 23 | INK 23 | YES | 35 | NO |
| EXAMPLE 24 | INK 24 | YES | 35 | NO |

TABLE 5

| | PRIMARY HEATING STEP | | | |
| --- | --- | --- | --- | --- |
| | INK COMPO- SITION | YES or NO | SURFACE TEMPERATURE OF RECORDING MEDIUM [° C.] | CIRCU- LATION FUNC- TION |
| EXAMPLE 25 | INK 25 | YES | 35 | NO |
| EXAMPLE 26 | INK 26 | YES | 35 | NO |
| EXAMPLE 27 | INK 27 | YES | 35 | NO |
| EXAMPLE 28 | INK 28 | YES | 35 | NO |
| EXAMPLE 29 | INK 27 | YES | 30 | NO |
| EXAMPLE 30 | INK 27 | YES | 40 | NO |
| COMPARATIVE EXAMPLE 1 | INK 5 | YES | 35 | NO |
| COMPARATIVE EXAMPLE 2 | INK 6 | YES | 35 | NO |
| COMPARATIVE EXAMPLE 3 | INK 13 | YES | 35 | NO |
| COMPARATIVE EXAMPLE 4 | INK 14 | YES | 35 | NO |
| COMPARATIVE EXAMPLE 5 | INK 15 | YES | 35 | NO |
| COMPARATIVE EXAMPLE 6 | INK 16 | YES | 35 | NO |
| COMPARATIVE EXAMPLE 7 | INK 17 | YES | 35 | NO |

TABLE 5-continued

| | | PRIMARY HEATING STEP | | |
|---|---|---|---|---|
| | INK COMPO-SITION | YES or NO | SURFACE TEMPERATURE OF RECORDING MEDIUM [° C.] | CIRCU-LATION FUNC-TION |
| COMPARATIVE EXAMPLE 8 | INK 18 | YES | 35 | NO |
| COMPARATIVE EXAMPLE 9 | INK 1 | NO | 25 | NO |
| COMPARATIVE EXAMPLE 10 | INK 2 | NO | 25 | NO |
| COMPARATIVE EXAMPLE 11 | INK 3 | NO | 25 | NO |
| COMPARATIVE EXAMPLE 12 | INK 4 | NO | 25 | NO |
| COMPARATIVE EXAMPLE 13 | INK 5 | NO | 25 | NO |
| COMPARATIVE EXAMPLE 14 | INK 9 | NO | 25 | NO |
| COMPARATIVE EXAMPLE 15 | INK 10 | NO | 25 | NO |
| COMPARATIVE EXAMPLE 16 | INK 11 | NO | 25 | NO |
| COMPARATIVE EXAMPLE 17 | INK 12 | NO | 25 | NO |
| COMPARATIVE EXAMPLE 18 | INK 13 | NO | 25 | NO |

5. Evaluation 5-1. Ejection Stability

Except for that intermittent ejection was performed such that an idle running to eject no ink composition from the head and a main scanning to eject the ink were alternately performed during printing, a recorded matter was manufactured in a manner similar to that described in the above "4", and the state of the ink jet nozzle after one hour-operation was confirmed and then evaluated by the following criteria. A level C or higher was regarded as a preferable level.

A: rate of non-ejection nozzles is 0%.
B: rate of non-ejection nozzles is 2% or less.
C: rate of non-ejection nozzles is more than 2% to 5%.
D: rate of non-ejection nozzles is more than 5%.

5-2. Aggregation Irregularity (4-Pass Recording)

The recorded portion by the 4-pass recording of each of the recorded matters manufactured in the above Examples and Comparative Examples was observed by visual inspection and then evaluated by the following criteria. A level C or higher was regarded as a preferable level.

A: No aggregation irregularity is observed, and uniform image is formed.
B: fine aggregation irregularity is slightly observed.
C: small number of large aggregation irregularities is observed.
D: considerable number of large aggregation irregularities is observed.

5-3. Irregularity by Coffee Stain Phenomenon

The recorded portion by the 4-pass recording of each of the recorded matters manufactured in the above Examples and Comparative Examples was observed by visual inspection and then evaluated by the following criteria.

In addition, except for that 8-pass recording was performed such that one sub-scanning distance was set to one eighth of the length of the nozzle line, and the ink was adhered to the same region by 8 main scannings, a recorded portion on the recording medium was evaluated in a manner similar to that described above.

A: No irregularity by coffee stain phenomenon is observed, and uniform image is formed.
B: irregularity by coffee stain phenomenon is slightly observed.
C: irregularity by coffee stain phenomenon is apparently observed.

5-4. Image Glossiness

The recorded matters manufactured in each of the above Examples and Comparative Examples were observed by visual inspection and then evaluated by the following criteria.

A: Glossy
B: No glossy 5-5. Abrasion Resistance

After the recorded portion of the recorded matter manufactured in each of the above Examples and the Comparative Examples was rubbed 50 times by canequim containing moisture with a load of 500 g, the state of the recorded portion was observed by visual inspection and then evaluated by the following criteria. A level C or higher was regarded as a preferable level.

A: No change is observed.
B: Although peeling of recorded portion is observed, no recording medium is exposed.
C: Peeling of recorded portion is observed, and recording medium is slightly exposed.
D: Peeling of recorded portion is observed, and recording medium is apparently exposed.

5-6. Secondary Drying Property

Except for that the heating by the curing heater functioning as the secondary heating device was not performed, a recorded matter was manufactured in a manner similar to that described in the above "4" and then processed by a heat treatment in an oven while the heating temperature was variously changed. Subsequently, a heating temperature required to dry the surface of the recorded portion so as not to be sticky was confirmed, and the evaluation was performed by the following criteria. As this temperature is lower, a secondary drying property can be regarded superior.

A: stickiness disappears at an oven heating temperature of 70° C. or less.
B: stickiness disappears at an oven heating temperature of more than 70° C. to 75° C.
C: stickiness disappears at an oven heating temperature of more than 75° C.

5-7. Aggregation Irregularity (8-Pass Recording)

Except for that 8-pass recording was performed such that one sub-scanning distance was set to one eighth of the length of the nozzle line, and the ink was adhered to the same region by 8 main scannings, recording was performed in a manner similar to that of the above "5-2", and a recorded portion on the recording medium was evaluated in a manner similar to that of the aggregation irregularity described above. In addition, when the pass number is increased, the aggregation irregularity tends to be suppressed; hence, compared to the 4-pass recording, the aggregation irregularity of the 8-pass recording tends to be improved as a whole.

Those results are collectively shown in Tables 6 and 7.

TABLE 6

| | EJECTION STABILITY | AGGREGATION IRREGULARITY (4-PASS) | AGGREGATION IRREGULARITY (8-PASS) | IRREGULARITY BY COFFEE STAIN PHENOMENON (4-PASS) | IRREGULARITY BY COFFEE STAIN PHENOMENON (8-PASS) | IMAGE GLOSSINESS | ABRASION RESISTANCE | SECONDARY DRYING |
|---|---|---|---|---|---|---|---|---|
| EXAMPLE 1 | A | A | A | A | A | A | B | A |
| EXAMPLE 2 | A | B | A | A | A | A | B | A |
| EXAMPLE 3 | A | A | A | A | A | A | B | B |
| EXAMPLE 4 | A | B | A | A | A | A | A | B |
| EXAMPLE 5 | A | B | B | A | B | A | B | A |
| EXAMPLE 6 | A | C | C | B | B | A | B | A |
| EXAMPLE 7 | A | B | B | A | B | A | B | B |
| EXAMPLE 8 | A | C | C | B | B | A | A | B |
| EXAMPLE 9 | C | A | A | A | A | A | B | A |
| EXAMPLE 10 | C | B | A | A | A | A | B | A |
| EXAMPLE 11 | C | A | A | A | A | A | B | B |
| EXAMPLE 12 | C | B | A | A | A | A | A | B |
| EXAMPLE 13 | C | C | B | A | A | A | B | A |
| EXAMPLE 14 | C | A | A | A | A | B | C | A |
| EXAMPLE 15 | B | C | B | A | A | A | B | A |
| EXAMPLE 16 | B | C | C | B | B | A | B | A |
| EXAMPLE 17 | B | C | B | A | A | A | B | B |
| EXAMPLE 18 | B | C | C | B | B | A | A | B |
| EXAMPLE 19 | A | A | A | C | B | A | B | A |
| EXAMPLE 20 | A | B | A | A | A | A | B | A |
| EXAMPLE 21 | A | B | A | A | A | A | B | A |
| EXAMPLE 22 | A | C | B | A | A | A | B | A |
| EXAMPLE 23 | A | C | B | C | B | A | B | A |
| EXAMPLE 24 | B | A | A | A | A | A | B | A |

TABLE 7

| | EJECTION STABILITY | AGGREGATION IRREGULARITY (4-PASS) | AGGREGATION IRREGULARITY (8-PASS) | IRREGULARITY BY COFFEE STAIN PHENOMENON (4-PASS) | IRREGULARITY BY COFFEE STAIN PHENOMENON (8-PASS) | IMAGE GLOSSINESS | ABRASION RESISTANCE | SECONDARY DRYING |
|---|---|---|---|---|---|---|---|---|
| EXAMPLE 25 | B | B | A | A | B | A | B | A |
| EXAMPLE 26 | B | A | A | A | A | A | B | B |
| EXAMPLE 27 | B | B | A | A | A | A | A | A |
| EXAMPLE 28 | B | B | A | B | A | A | B | A |
| EXAMPLE 29 | A | C | B | B | B | A | A | A |
| EXAMPLE 30 | C | A | A | A | A | A | A | A |
| COMPARATIVE EXAMPLE 1 | D | B | A | A | A | A | B | B |
| COMPARATIVE EXAMPLE 2 | C | A | A | A | A | A | D | B |
| COMPARATIVE EXAMPLE 3 | D | D | A | A | A | A | B | B |
| COMPARATIVE EXAMPLE 4 | B | C | C | B | B | A | D | B |
| COMPARATIVE EXAMPLE 5 | B | D | C | C | C | A | B | B |
| COMPARATIVE EXAMPLE 6 | A | D | C | C | C | A | B | C |
| COMPARATIVE EXAMPLE 7 | A | D | C | C | C | A | B | B |
| COMPARATIVE EXAMPLE 8 | A | D | C | C | C | A | B | C |
| COMPARATIVE EXAMPLE 9 | C | D | C | C | B | A | B | A |
| COMPARATIVE EXAMPLE 10 | C | D | C | C | B | A | B | A |
| COMPARATIVE EXAMPLE 11 | C | D | C | C | B | A | B | B |
| COMPARATIVE EXAMPLE 12 | C | D | C | C | B | A | A | B |
| COMPARATIVE EXAMPLE 13 | D | D | C | A | A | A | B | B |

TABLE 7-continued

| | EJECTION STABILITY | AGGREGATION IRREGULARITY (4-PASS) | AGGREGATION IRREGULARITY (8-PASS) | IRREGULARITY BY COFFEE STAIN PHENOMENON (4-PASS) | IRREGULARITY BY COFFEE STAIN PHENOMENON (8-PASS) | IMAGE GLOSSINESS | ABRASION RESISTANCE | SECONDARY DRYING |
|---|---|---|---|---|---|---|---|---|
| COMPARATIVE EXAMPLE 14 | B | D | C | C | C | A | B | A |
| COMPARATIVE EXAMPLE 15 | B | D | C | C | C | A | B | A |
| COMPARATIVE EXAMPLE 16 | B | D | C | C | C | A | B | B |
| COMPARATIVE EXAMPLE 17 | B | D | C | C | C | A | A | B |
| COMPARATIVE EXAMPLE 18 | D | D | C | A | A | A | B | B |

As shown in Tables 6 and 7, in Examples in each of which the ink contains the specific organic compound, and the primary heating step is performed, the ejection stability, the suppression of the aggregation irregularity, and the abrasion resistance are all excellent.

On the other hand, in Comparative Examples different from the above Examples, at least one of the ejection stability, the suppression of the aggregation irregularity, and the abrasion resistance is inferior.

From Examples 9 to 27, it is found that an excellent ejection stability can be obtained even when a recording apparatus including no circulation mechanism is used.

For example, in comparison between Examples 9 and 24, it is found that the ejection stability is superior when the ink contains the organic solvent.

For example, from Comparative Examples 1, 2, and 15, it is found that when the ink contains no specific organic compound, at least one of the ejection stability, the suppression of the aggregation irregularity, and the abrasion resistance is inferior.

For example, from Comparative Example 9, it is found that when the primary heating step is not performed, the suppression of the aggregation irregularity is inferior.

What is claimed is:

1. A recording method comprising:
   an adhesion step of ejecting an ink composition from an ink jet head to be adhered to a recording medium, the adhesion step being performed on a scanning region of the recording medium by at least one main scanning; and
   a primary heating step of heating the ink composition adhered to the recording medium in the adhesion step, the primary heating step being conducted by a primary heating device and a surface temperature of the recording medium when the ink composition is heated in the primary heating step is 34 degrees C. to 50 degrees C.
   wherein the ink composition is a water-based ink containing:
      an organic compound which is a solid at 25° C. having a standard boiling point of 280° C. or less and which has a solubility of 50 [g/100 g of water] or more in water at 25° C., a content of the organic compound in the ink composition being 1.0 to 15.0% by mass,
      an organic solvent that is liquid at 25 degrees C. a content of the organic solvent in the ink composition being 10.0 to 40.0% by mass,
   the organic compound is not an organic solvent and is at least one selected from the group consisting of a diol having a cyclic structure and a cyclic amide, and
   in the primary heating step:
      the ink composition is adhered to a heated recording medium; or
      liquid droplets of the ink composition are started to heat within 0.5 seconds after the liquid droplets of the ink composition are adhered to the recording medium.

2. The recording method according to claim 1, wherein the organic compound has a standard boiling point of 160° C. to 280° C.

3. The recording method according to claim 1, wherein a content of the organic compound in the ink composition is 2.0 to 10.0 percent by mass.

4. The recording method according to claim 1, wherein the organic compound has a melting point of more than 25° C. to 150° C.

5. The recording method according to claim 1, wherein the organic compound is at least one selected from the group consisting of 1,2-cyclohexanediol and ε-caprolactam.

6. The recording method according to claim 1, wherein the ink composition further contains, as the organic solvent, a polyol which is a liquid at 25° C. having a standard boiling point of 160° C. or more.

7. The recording method according to claim 1, wherein the ink composition further contains a silicone-based surfactant having an HLB value of 10 or less.

8. The recording method according to claim 1, wherein when the ink composition is heated in the primary heating step, the recording medium has a surface temperature of 34 degrees C. to 46 degrees C.

9. The recording method according to claim 1, wherein the number of the main scannings performed on the same scanning region of the recording medium is 1 to 10.

10. The recording method according to claim 1, wherein the ink jet head has a circulation mechanism to circulate the ink composition.

11. The recording method according to claim 1, further comprising: after the primary heating step, a secondary heating step of further heating the recording medium.

12. The recording method according to claim 1, wherein the recording medium is a low-absorbing recording medium or a non-absorbing recording medium.

13. A recording apparatus to perform recording by the recording method according to claim 1, the recording apparatus comprising:
   a primary heating device to conduct the primary heating step; and
   an ink jet head to eject the ink composition to the recording medium.

14. The recording method according to claim 1, wherein a content of the organic compound in the ink composition is 5.0 to 15.0 percent by mass.

\* \* \* \* \*